US010743158B2

(12) United States Patent
Punithan et al.

(10) Patent No.: US 10,743,158 B2
(45) Date of Patent: Aug. 11, 2020

(54) COMMUNICATION APPARATUS FOR VEHICLE AND VEHICLE

(71) Applicant: LG ELECTRONICS INC., Seoul (KR)

(72) Inventors: Xavier Punithan, Seoul (KR); Hyunho Ki, Seoul (KR); Hanbyul Seo, Seoul (KR); Juhnho Park, Seoul (KR); Byeongrim Jo, Seoul (KR); Joseph Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 204 days.

(21) Appl. No.: 15/938,644

(22) Filed: Mar. 28, 2018

(65) Prior Publication Data
US 2018/0288589 A1 Oct. 4, 2018

Related U.S. Application Data

(60) Provisional application No. 62/478,613, filed on Mar. 30, 2017, provisional application No. 62/551,523, filed on Aug. 29, 2017.

(30) Foreign Application Priority Data

Sep. 20, 2017 (KR) .................. 10-2017-0121406

(51) Int. Cl.
*H04W 4/46* (2018.01)
*H04L 29/06* (2006.01)
(Continued)

(52) U.S. Cl.
CPC .............. *H04W 4/46* (2018.02); *H04L 69/14* (2013.01); *H04W 4/40* (2018.02); *H04W 28/02* (2013.01);
(Continued)

(58) Field of Classification Search
CPC ......... H04W 4/46; H04W 28/02; H04W 4/40; H04W 56/001; H04W 72/0453;
(Continued)

(56) References Cited

U.S. PATENT DOCUMENTS 9,031,498 B1 * 5/2015 Bertz ................. H04W 84/005
340/539.1
2010/0062800 A1 3/2010 Gupta et al.
(Continued)

FOREIGN PATENT DOCUMENTS

WO WO 2013/126859 A2 8/2013
WO WO-2013126859 A2 * 8/2013 ........ H04W 72/1215

OTHER PUBLICATIONS

Sorrentino et al. U.S. Appl. No. 62/303,158, filed Mar. 3, 2016, hereinafter Prov'158 (Year: 2016).*
(Continued)

*Primary Examiner* — Wutchung Chu
(74) *Attorney, Agent, or Firm* — Birch, Stewart, Kolasch & Birch, LLP

(57) ABSTRACT

A communication apparatus for vehicle, which communicates with an entity including at least one of a nearby vehicle, infrastructure, and a mobile terminal. The communication apparatus includes a first communication unit configured to transmit a first transmission signal to the entity, and receive a first receipt signal from the entity using a first communication technology; a second communication unit configured to transmit a second transmission signal to the entity, and receive a second receipt signal from the entity using a second communication technology different than the first communication technology; and a processor configured to determine a transmission characteristic of the first transmission signal and the second transmission signal and a reception characteristic of the first receipt signal and the second receipt signal, transmit a first message using at least
(Continued)

one of only the first transmission signal, only the second transmission signal, and a combination of the first transmission signal and the second transmission signal based on the determined transmission characteristic of the first transmission signal and the second transmission signal, and receive a second message using at least one of only the first receipt signal, only the second receipt signal, and a combination of the first receipt signal and the second receipt signal based on the determined transmission characteristic of the first transmission signal and the second transmission signal.

17 Claims, 30 Drawing Sheets

(51) Int. Cl.
*H04W 4/40* (2018.01)
*H04W 28/02* (2009.01)
*H04W 56/00* (2009.01)
*H04W 72/04* (2009.01)
*H04W 72/08* (2009.01)
*H04W 88/06* (2009.01)
*H04L 12/801* (2013.01)

(52) U.S. Cl.
CPC ..... *H04W 56/001* (2013.01); *H04W 72/0453* (2013.01); *H04W 72/0493* (2013.01); *H04W 72/085* (2013.01); *H04L 47/11* (2013.01); *H04W 88/06* (2013.01)

(58) Field of Classification Search
CPC ........... H04W 72/0493; H04W 72/085; H04W 88/06; H04L 69/14; H04L 47/11
See application file for complete search history.

(56) References Cited

U.S. PATENT DOCUMENTS

| | | | |
|---|---|---|---|
| 2015/0296411 A1* | 10/2015 | Meyer | G08G 1/0112 370/336 |
| 2016/0150451 A1* | 5/2016 | Barreto De Miranda Sargento | H04W 36/14 370/332 |
| 2016/0242223 A1* | 8/2016 | Brahmi | H04W 28/021 |
| 2017/0331836 A1* | 11/2017 | De Souza Schwartz | H04W 12/1006 |
| 2018/0213420 A1* | 7/2018 | Simsek | H04L 67/12 |
| 2019/0097932 A1* | 3/2019 | Buczek | B60W 30/00 |
| 2019/0182700 A1* | 6/2019 | Kim | H04W 12/06 |
| 2019/0253958 A1* | 8/2019 | Lee | H04W 48/20 |
| 2019/0320475 A1* | 10/2019 | Li | H04W 72/121 |
| 2019/0349957 A1* | 11/2019 | Sorrentino | H04L 67/16 |

OTHER PUBLICATIONS

3GPP, "3rd Generation Partnership Project; Technical Specification Group Services and System Aspects; Study on enhancement of 3GPP Support for 5G V2X Services (Release 15)," 3GPP TR 22.886 V15.1.0, Mar. 2017 (downloaded by EPO Mar. 17, 2017), pp. 1-58.
Qualcomm Incorporated, "Co-channel coexistence between V2V and DSRC," 3GPP TSG-RAN WG1 #85, R1-164457, Nanjing, China, May 23-27, 2016 (downloaded by EPO May 14, 2016), 4 pages.

* cited by examiner

US . Otion 1

US : Otion 2

US : Otion 3

COMMUNICATION APPARATUS FOR VEHICLE AND VEHICLE

CROSS-REFERENCE TO RELATED APPLICATION

This application claims the priority benefit of U.S. Provisional Application No. 62/551,523, filed on Aug. 29, 2017, U.S. Provisional Application No. 62/478,613, filed on Mar. 30, 2017, and Patent Application No. 10-2017-0121406, filed in the Republic of Korea on Sep. 20, 2017, all of which are hereby expressly incorporated by reference into the present application.

BACKGROUND OF THE INVENTION

1. Field of the Invention

The present invention relates to a communication apparatus and a vehicle.

2. Description of the Related Art

A vehicle is an apparatus that moves in a direction desired by a user riding therein. A representative example of a vehicle may be an automobile. Further, a variety of sensors and electronic devices are mounted in vehicles for the convenience of a user who uses the vehicle. In particular, for user driving convenience, an Advanced Driver Assistance System (ADAS) has been actively studied. In addition, enormous efforts are being made to develop autonomous vehicles.

In addition, with advancement of technologies, technologies for vehicle-to-vehicle (V2V) communication and vehicle-to-infrastructure (V2I) communication are developed as well. Also, during travelling of a vehicle, communication traffic increases in response to increasing demands for data required through communication. In this instance, a data loss may occur leading to failure of receiving data essential for driving the vehicle, thereby possibly causing an accident.

SUMMARY OF THE INVENTION

Accordingly, one object of the present invention is to solve the above-noted and other problems with the related art.

Another object of the present invention to provide a communication apparatus for a vehicle, which can handle excessive communication traffic.

Still another object of the present invention to provide a vehicle including the aforementioned communication apparatus.

To achieve these and other advantages and in accordance with the purpose of the present invention, as embodied and broadly described herein, the present invention provides in one aspect a communication apparatus for vehicle, which communicates with an entity including at least one of a nearby vehicle, infrastructure, and a mobile terminal. The communication apparatus includes a first communication unit configured to transmit a first transmission signal to the entity, and receive a first receipt signal from the entity using a first communication technology; a second communication unit configured to transmit a second transmission signal to the entity, and receive a second receipt signal from the entity using a second communication technology different than the first communication technology; and a processor configured to determine a transmission characteristic of the first transmission signal and the second transmission signal and a reception characteristic of the first receipt signal and the second receipt signal, transmit a first message using at least one of only the first transmission signal, only the second transmission signal, and a combination of the first transmission signal and the second transmission signal based on the determined transmission characteristic of the first transmission signal and the second transmission signal, and receive a second message using at least one of only the first receipt signal, only the second receipt signal, and a combination of the first receipt signal and the second receipt signal based on the determined transmissive characteristics of the first receipt signal and the second receipt signal.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The embodiments will be described in detail with reference to the following drawings in which like reference numerals refer to like elements wherein:

FIGS. 19B to 20F are diagrams illustrating a frequency band available for a communication apparatus according to an embodiment of the present invention.

DETAILED DESCRIPTION OF THE EMBODIMENTS

Figure 1:
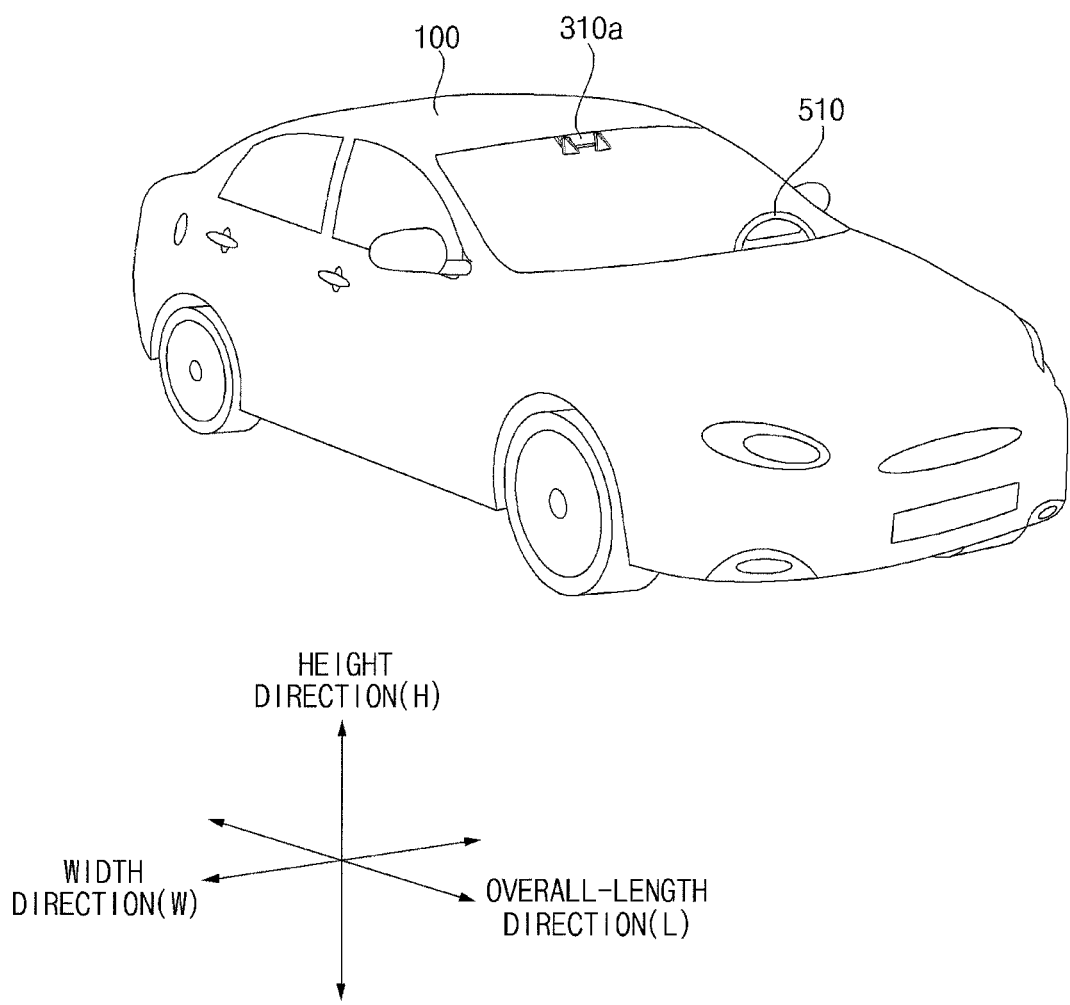
FIG. 1 is a view illustrating an external appearance of a vehicle according to an embodiment of the present invention.
Figure 2:
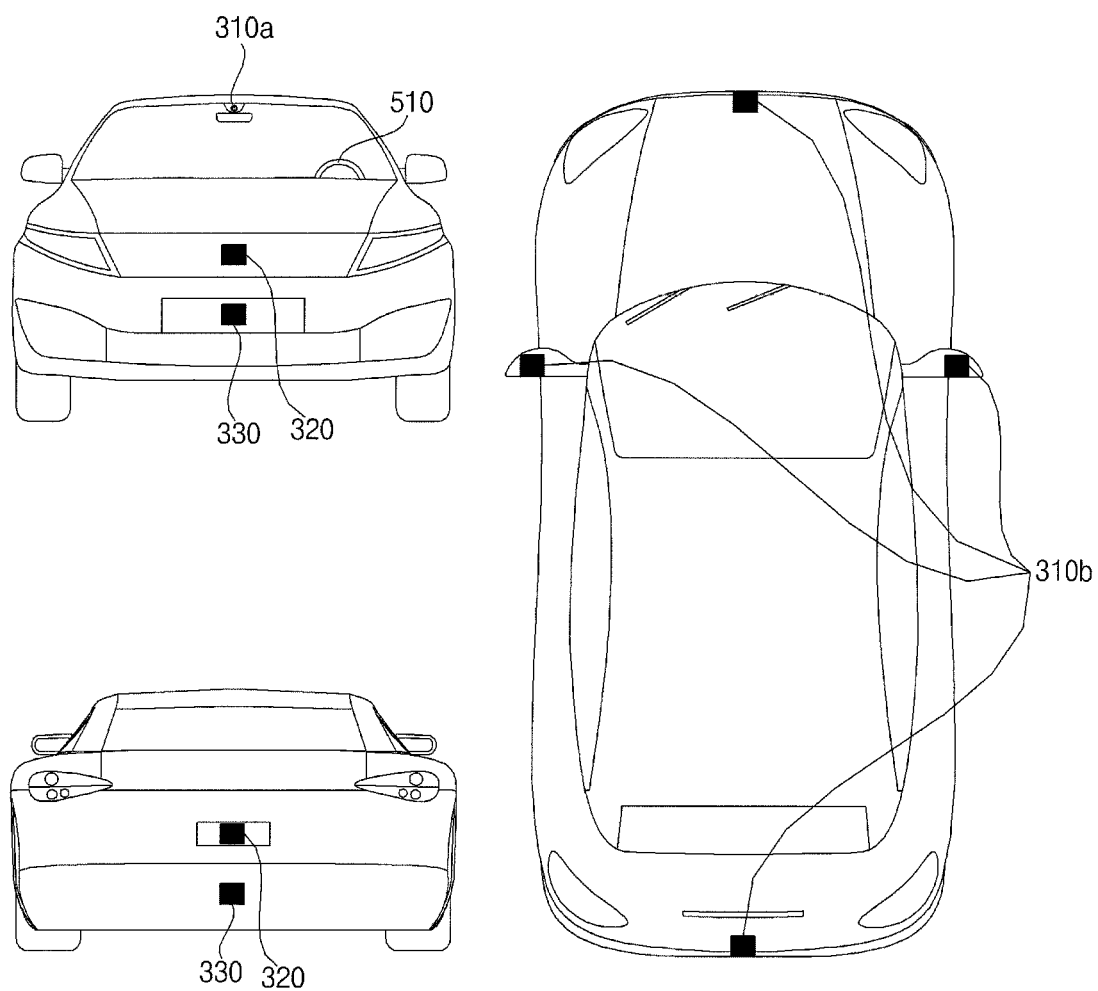
FIG. 2 includes different angled views of the external appearance of a vehicle according to an embodiment of the present invention.
Figure 3:
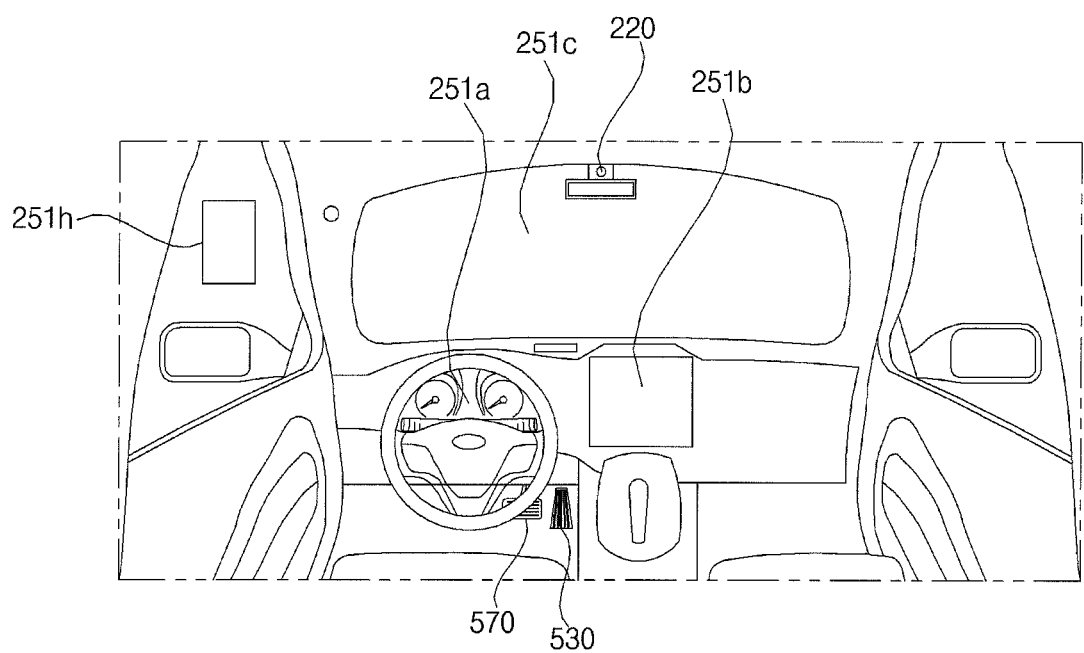
FIGS. 3 and 4 are views illustrating an interior configuration of a vehicle according to an embodiment of the present invention.
Figure 4:
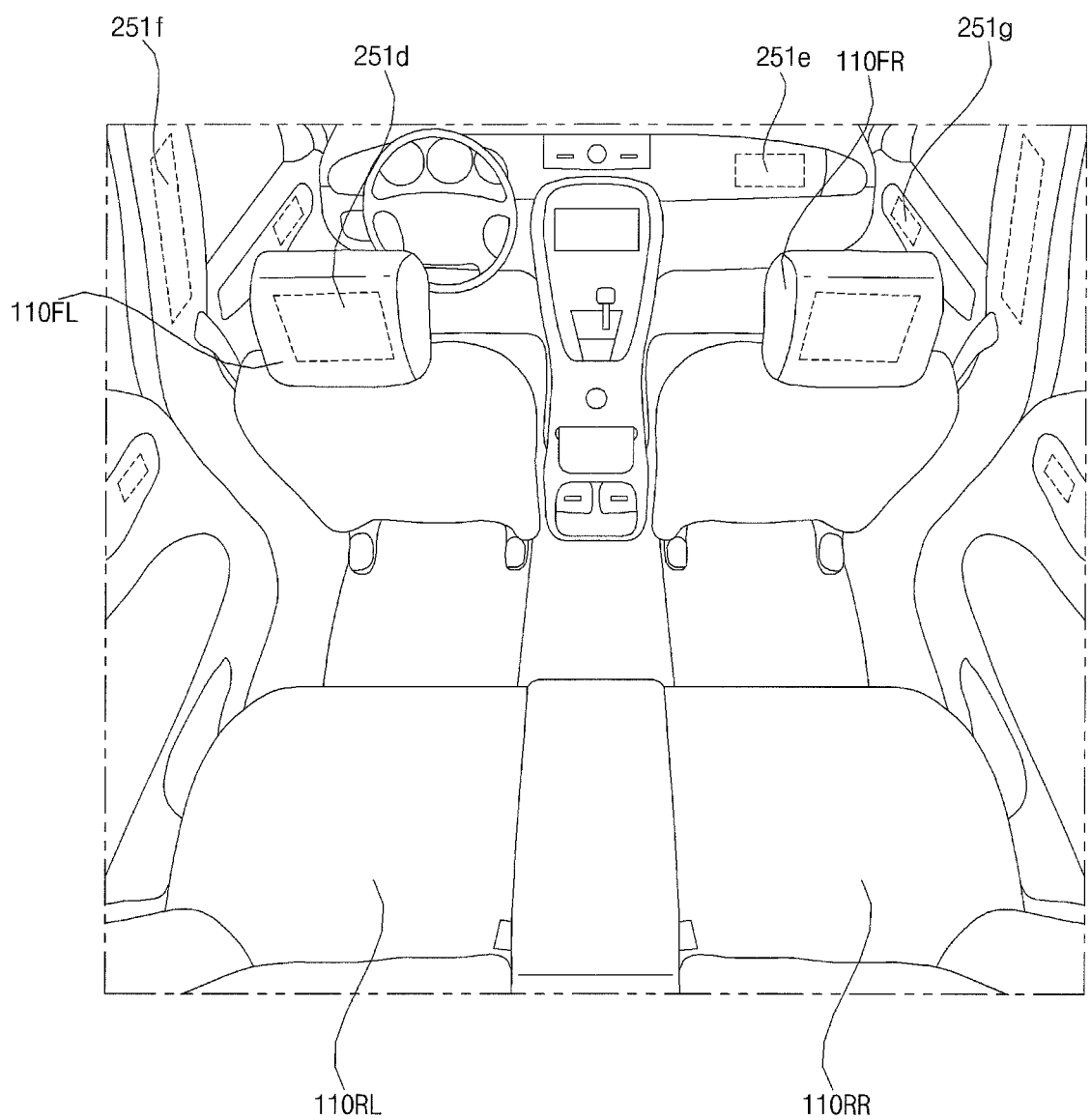

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other.

In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present invention.

Although the terms "first," "second," etc., may be used herein to describe various components, these components should not be limited by these terms. These terms are only used to distinguish one component from another component. When a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise. In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include an automobile and a motorcycle. Hereinafter, a description will be given based on an automobile. Further, a vehicle as described in this specification may include all of an internal combustion engine vehicle including an engine as a power source, a hybrid vehicle including both an engine and an electric motor as a power source, and an electric vehicle including an electric motor as a power source. In the following description, "the left side of the vehicle" refers to the left side in the forward driving direction of the vehicle, and "the right side of the vehicle" refers to the right side in the forward driving direction of the vehicle.

Referring to FIGS. 1 to 7, a vehicle 100 can includes a plurality of wheels, which are rotated by a power source, and a steering input device 510 for controlling a driving direction of the vehicle 100. The vehicle 100 can be an autonomous vehicle that can be switched to an autonomous driving mode or a manual mode in response to a user input.

For example, in response to a user input received through a user interface device 200, the vehicle 100 can be switched from a manual mode to an autonomous driving mode, or vice versa. The vehicle 100 can also be switched to the autonomous driving mode or to the manual mode based on driving situation information.

In more detail, the driving situation information may include at least one of the following: information on an object located outside the vehicle 100, navigation information, and vehicle state information. For example, the vehicle 100 can switch from the manual mode to the autonomous driving mode, or vice versa, based on driving situation information generated by an object detection device 300.

In another example, the vehicle 100 can switch from the manual mode to the autonomous driving mode, or vice versa, based on driving situation information received through a communication device 400. The vehicle 100 can also switch from the manual mode to the autonomous driving mode, or vice versa, based on information, data, and a signal provided from an external device.

When the vehicle 100 operates in the autonomous driving mode, the autonomous vehicle 100 can operate based on a vehicle operation system 700. For example, the autonomous vehicle 100 can operate based on information, data, or signals generated by a driving system 710, a pulling-out system 740, and a parking system 750.

While operating in the manual mode, the autonomous vehicle 100 can receive a user input for driving of the vehicle 100 through a driving maneuvering device 500. In response to the user input received through the driving maneuvering device 500, the vehicle 100 can operate.

In addition, the term "overall length" means the length from the front end to the rear end of the vehicle 100, the term "overall width" means the width of the vehicle 100, and the term "overall height" means the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

Figure 7:
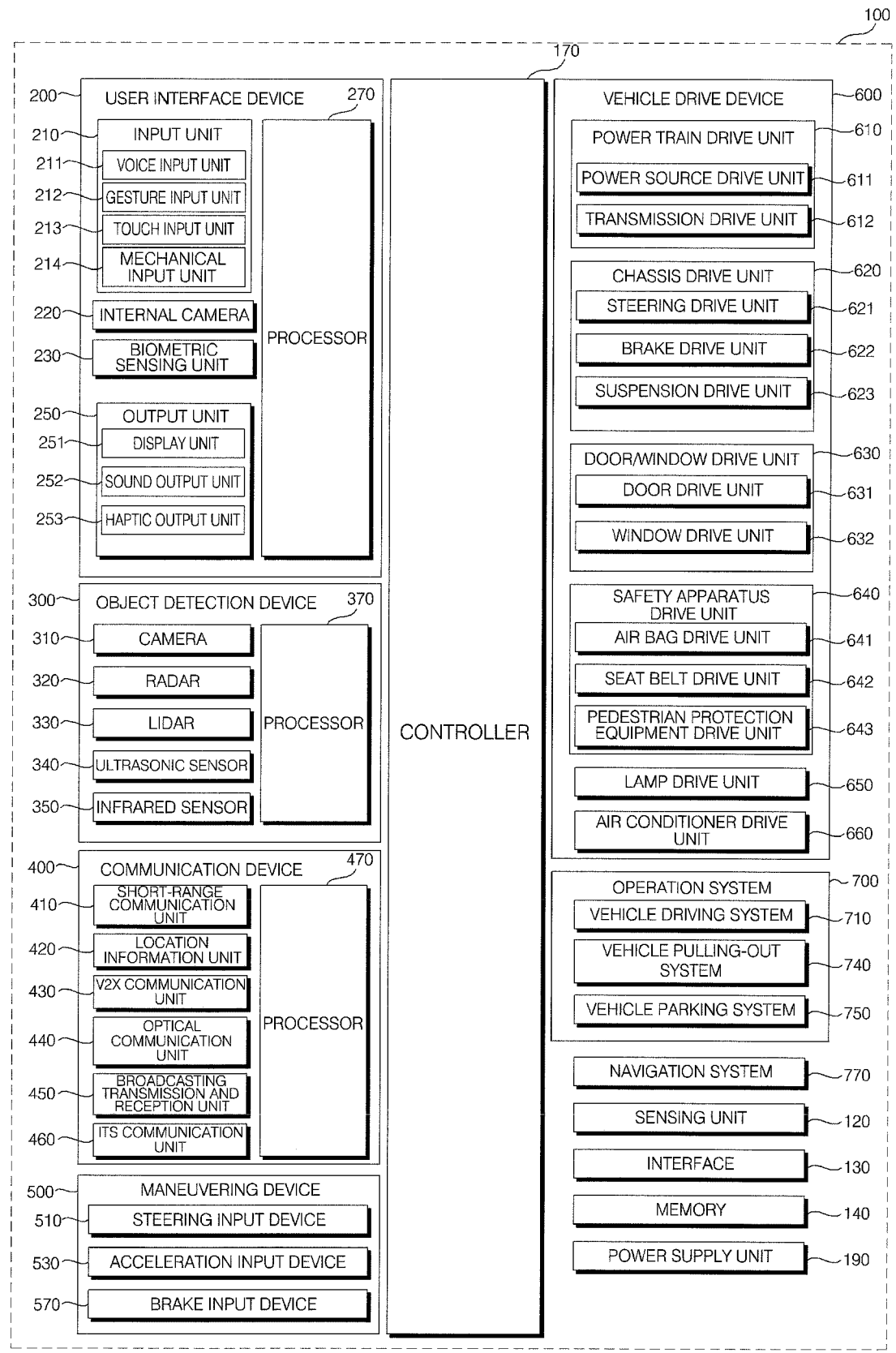
FIG. 7 is a block diagram illustrating a vehicle according to an embodiment of the present invention.

As illustrated in FIG. 7, the vehicle 100 can include the user interface device 200, the object detection device 300, the communication device 400, the driving maneuvering device 500, a vehicle drive device 600, the vehicle operation system 700, a navigation system 770, a sensing unit 120, an interface 130, a memory 140, a controller 170, and a power supply unit 190. In some embodiments, the vehicle 100 can further include other components in addition to the aforementioned components, or may not include some of the aforementioned components.

The user interface device 200 is provided to support communication between the vehicle 100 and a user. The user interface device 200 can receive a user input, and provide information generated in the vehicle 100 to the user. The vehicle 100 can also enable User Interfaces (UI) or User Experience (UX) through the user interface device 200.

Further, the user interface device 200 may include an input unit 210, an internal camera 220, a biometric sensing unit 230, an output unit 250, and a processor 270. In some embodiments, the user interface device 200 may further include other components in addition to the aforementioned components, or may not include some of the aforementioned components.

The input unit 210 can receive information from a user, and data collected in the input unit 210 can be analyzed by the processor 270 and then processed into a control command of the user. Further, the input unit 210 can be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may also include a voice input unit 211, a gesture input unit 212, a touch input unit 213, and a mechanical input unit 214. The voice input unit 211 can convert a voice input of a user into an electrical signal. The converted electrical signal can then be provided to the processor 270 or the controller 170. Further, the voice input unit 211 may include one or more microphones.

The gesture input unit 212 can convert a gesture input of a user into an electrical signal. The converted electrical signal may be provided to the processor 270 or the controller 170. In addition, the gesture input unit 212 may include at least one of an infrared sensor and an image sensor for sensing a gesture input of a user.

In some embodiments, the gesture input unit 212 can sense a three-dimensional (3D) gesture input of a user. Thus, the gesture input unit 212 may include a plurality of light emitting units for outputting infrared light, or a plurality of image sensors. Further, the gesture input unit 212 can sense a 3D gesture input by employing a Time of Flight (TOF) scheme, a structured light scheme, or a disparity scheme.

The touch input unit 213 can convert a user's touch input into an electrical signal, and the converted electrical signal can be provided to the processor 270 or the controller 170. The touch input unit 213 may include a touch sensor for sensing a touch input of a user.

In some embodiments, the touch input unit 210 may be formed integral with a display unit 251 to implement a touch screen. The touch screen can provide an input interface and an output interface between the vehicle 100 and the user.

Further, the mechanical input unit 214 may include at least one of a button, a dome switch, a jog wheel, and a jog switch. An electrical signal generated by the mechanical input unit 214 can be provided to the processor 270 or the controller 170. The mechanical input unit 214 may also be located on a steering wheel, a center fascia, a center console, a cockpit module, a door, etc.

The internal camera 220 can acquire images of the inside of the vehicle 100. Further, the processor 270 can sense a user's condition based on the images of the inside of the vehicle 100. The processor 270 can also acquire information on an eye gaze of the user, and sense a gesture of the user from the images of the inside of the vehicle 100.

In addition, the biometric sensing unit 230 can acquire biometric information of the user. The biometric sensing unit 230 may include a sensor for acquire biometric information of the user, and can utilize the sensor to acquire finger print information, heart rate information, etc. of the user. The biometric information may also be used for user authentication.

Further, the output unit 250 can generate a visual, audio, or tactile output. The output unit 250 may include at least one of a display unit 251, a sound output unit 252, and a haptic output unit 253.

In addition, the display unit 251 can display graphic objects corresponding to various types of information. The display unit 251 may include at least one of a Liquid Crystal Display (LCD), a Thin Film Transistor-Liquid Crystal Display (TFT LCD), an Organic Light-Emitting Diode (OLED), a flexible display, a 3D display, and an e-ink display.

Further, the display unit 251 can form an inter-layer structure together with the touch input unit 213, or be integrally formed with the touch input unit 213 to implement a touch screen. The display unit 251 may also be implemented as a Head Up Display (HUD). When implemented as a HUD, the display unit 251 may include a projector module in order to output information through an image projected on a windshield or a window.

The display unit 251 may include a transparent display attached on the windshield or the window. In more detail, the transparent display can display a predetermined screen with a predetermined transparency. In order to achieve the transparency, the transparent display may include at least one of a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In addition, the user interface device 200 may include a plurality of display units 251a to 251g. For example, the display unit 251 can be disposed in a region of a steering wheel, a region 251a, 251b, or 251e of an instrument panel, a region 251d of a seat, a region 251f of each pillar, a region 251g of a door, a region of a center console, a region of a head lining, a region of a sun visor, a region 251c of a windshield, or a region 251h of a window.

In addition, the sound output unit 252 converts an electrical signal from the processor 270 or the controller 170 into an audio signal, and outputs the audio signal. Thus, the sound output unit 252 may include one or more speakers.

Also, the haptic output unit 253 generates a tactile output. For example, the haptic output unit 253 can operate to vibrate a steering wheel, a safety belt, and seats 110FL, 110FR, 110RL, and 110RR so as to allow a user to recognize the output.

Further, the processor 270 can control the overall operation of each unit of the user interface device 200. In some embodiments, the user interface device 200 may include a plurality of processors 270 or may not include the processor 270.

When the user interface device 200 does not include the processor 270, the user interface device 200 can operate under control of the controller 170 or a processor of a different device inside the vehicle 100. In addition, the user interface device 200 may be referred to as a display device for vehicle. The user interface device 200 can also operate under the control of the controller 170.

In addition, the object detection device 300 can detect an object outside the vehicle 100 and generate information on the object based on sensing data. The information on the object may include information about the presence of the object, location information of the object, information on a distance between the vehicle 100 and the object, and information on a speed of movement of the vehicle 100 relative to the object. The object may also include various objects related to travelling of the vehicle 100.

Figure 5:
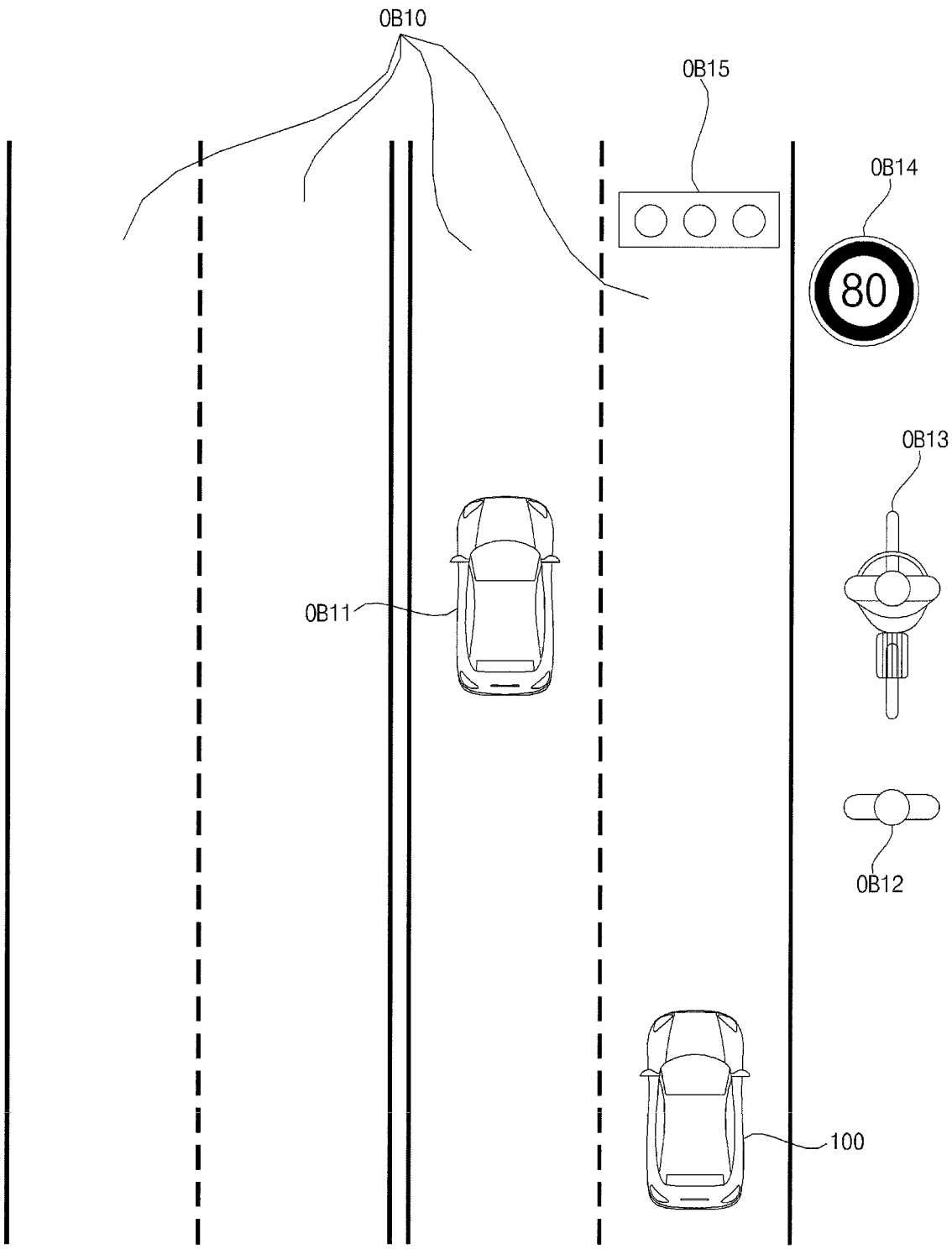
FIGS. 5 and 6 are views illustrating an object according to an embodiment of the present invention.
Figure 6:
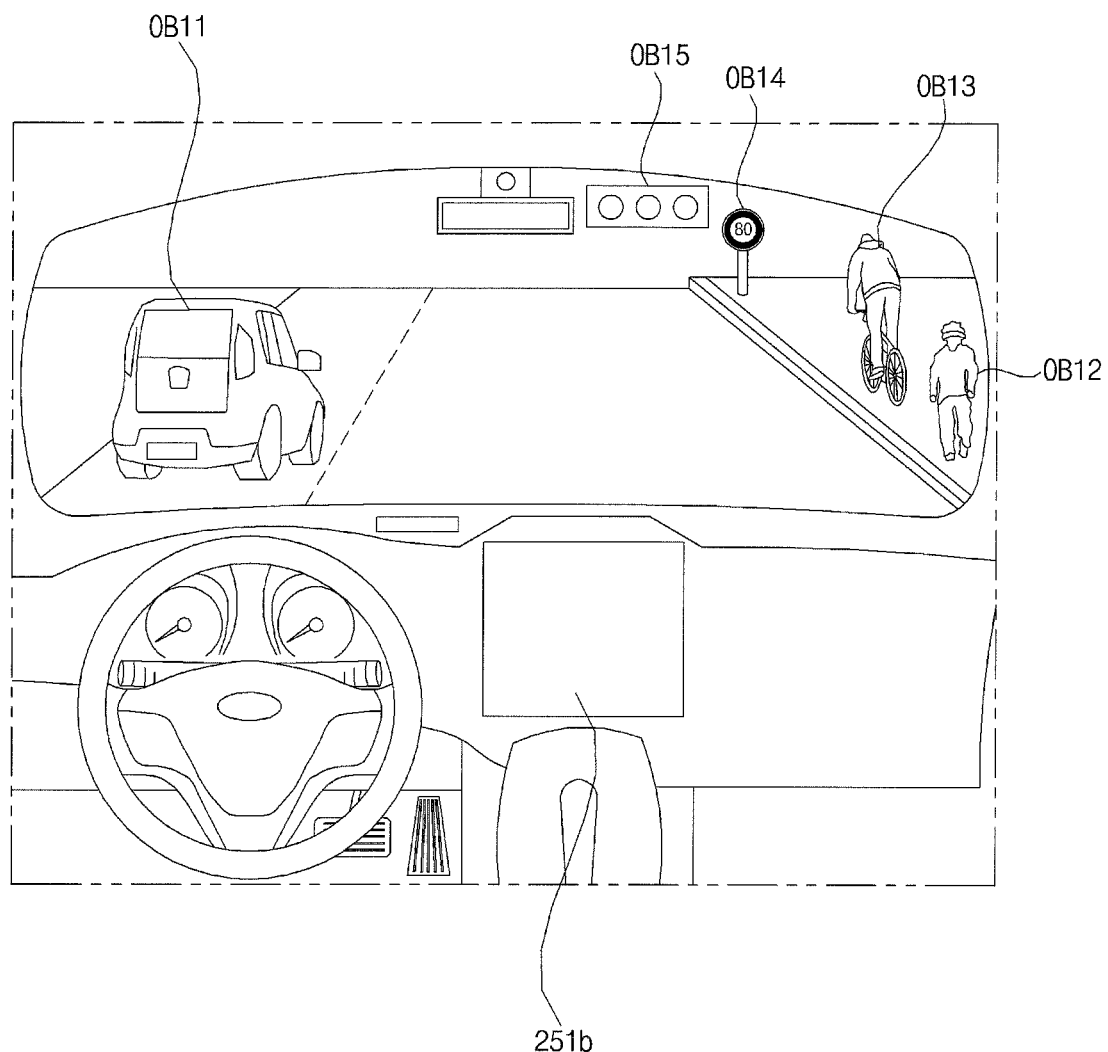

Referring to FIGS. 5 and 6, an object "OB" may include a lane OB10, a nearby vehicle OB11, a pedestrian OB12, a two-wheeled vehicle OB13, a traffic signal OB14 and OB15, a light, a road, a structure, a bump, a geographical feature, an animal, etc. The lane OB10 may be a lane in which the vehicle 100 is traveling, a lane next to the lane in which the vehicle 100 is traveling, or a lane in which a different vehicle is travelling in the opposite direction. The lane OB10 may include left and right lines that define the lane. The lane may be a concept including an intersection.

Further, the nearby vehicle OB11 may be a vehicle that is travelling in the vicinity of the vehicle 100, or a vehicle within a predetermined distance from the vehicle 100. For example, the nearby vehicle OB11 may be a vehicle that is preceding or following the vehicle 100.

In addition, the pedestrian OB12 may be a person located in the vicinity of the vehicle 100 or a person within a predetermined distance from the vehicle 100. For example, the pedestrian OB12 may be a person on a sidewalk or on the roadway.

The two-wheeled vehicle OB13 is a vehicle located in the vicinity of the vehicle 100 and moves with two wheels. The two-wheeled vehicle OB13 may also be a vehicle that has two wheels within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface. Also, the light may be light generated by a lamp provided in the nearby vehicle and/or light generated by a street light. The light may also be solar light.

Further, the road may include a road surface, a curve, and slopes, such as an upward slope and a downward slope. The structure may be a body located around the road in the state of being fixed onto the ground. For example, the structure may include a streetlight, a roadside tree, a building, a traffic light, a bridge, a curb, and a wall. The geographical feature may include a mountain and a hill.

In addition, the object may be classified as a movable object or a stationary object. For example, the movable object includes a moving nearby vehicle and a moving pedestrian. For example, the stationary object may be a traffic signal, a road, a structure, a stopped nearby vehicle, and a stopped pedestrian.

In addition, the object detection device 300 may include a camera 310, a radar 320, a lidar 330, a ultrasonic sensor 340, an infrared sensor 350, and a processor 370. In some embodiments, the object detection device 300 may further include other components in addition to the aforementioned components, or may not include some of the aforementioned components.

Further, the camera 310 may be located at an appropriate position outside the vehicle 100 in order to acquire images of the outside of the vehicle 100. The camera 310 may be a mono camera, a stereo camera 310a, an Around View Monitoring (AVM) camera 310b, or a 360-degree camera.

Using various image processing algorithms, the camera 310 can acquire location information of an object, information on a distance to the object, and information on speed relative to the object. For example, based on change in size over time of an object in acquired images, the camera 310 can acquire information on a distance to the object and information on speed relative to the object.

In another example, the camera 310 can acquire the information on a distance to the object and the information on a speed relative to the object, by using a pin hole model or profiling a road surface. In more detail, the camera 310 can acquire the information on a distance to the object and the information on the speed relative to the object, based on information on disparity in stereo images acquired by a stereo camera 310a.

In addition, the camera 310 may be disposed near a front windshield in the vehicle 100 in order to acquire images of the front of the vehicle 100. Alternatively, the camera 310 may be disposed around a front bumper or a radiator grill. In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door. The camera 310 can also provide an acquired image to the processor 370.

Further, the radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 can detect an object through the medium of an electromagnetic wave by employing a time of flight (TOF) scheme or a phase-shift scheme, and can detect a location of the detected object, the distance to the detected object, and the speed relative to the detected object. In addition, the radar 320 may be located at an appropriate position outside the vehicle 100 in order to sense an object located in front of the vehicle 100, an object located to the rear of the vehicle 100, or an object located to the side of the vehicle 100.

Also, the lidar 330 may include a laser transmission unit and a laser reception unit. The lidar 330 can be implemented by the TOF scheme or the phase-shift scheme and can also be implemented as a drive type lidar or a non-drive type lidar.

When implemented as the drive type lidar, the lidar 330 can rotate by a motor and detect an object in the vicinity of the vehicle 100. When implemented as the non-drive type lidar, the lidar 330 can utilize a light steering technique to detect an object located within a predetermined distance from the vehicle 100. The vehicle 100 can include a plurality of non-driving type lidars 330.

The lidar 330 can detect an object through the medium of laser light by employing the TOF scheme or the phase-shift scheme, and can detect a location of the detected object, the distance to the detected object, and the speed relative to the detected object. The lidar 330 may also be located at an appropriate position outside the vehicle 100 in order to sense an object located in front of the vehicle 100, an object located to the rear of the vehicle 100, or an object located to the side of the vehicle 100.

Further, the ultrasonic sensor 340 may include an ultrasonic wave transmission unit and an ultrasonic wave reception unit. The ultrasonic sensor 340 can detect an object based on an ultrasonic wave, and can detect a location of the detected object, the distance to the detected object, and the speed relative to the detected object.

In addition, the ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 350 can detect an object based on infrared light, and can detect a location of the detected object, the distance to the detected object, and the speed relative to the detected object.

The infrared sensor 350 may also be located at an appropriate position outside the vehicle 100 in order to sense an object located in front of the vehicle 100, an object located to the rear of the vehicle 100, or an object located to the side of the vehicle 100.

Further, the processor 370 can control the overall operation of each unit of the object detection device 300. In more detail, the processor 370 can detect or classify an object by comparing pre-stored data with data sensed by the camera 310, the radar 320, the lidar 330, the ultrasonic sensor 340, and the infrared sensor 350.

The processor 370 can also detect and track an object based on acquired images. Further, the processor 370 can calculate the distance to the object and the speed relative to the object by using an image processing algorithm. For example, the processor 370 can acquire information on the distance to the object and information on the speed relative to the object based on a variation in size over time of the object in acquired images.

In another example, the processor 370 can acquire information on the distance to the object or information on the speed relative to the object by using a pin hole model or by profiling a road surface. In more detail, the processor 370 can acquire information on the distance to the object and information on the speed relative to the object based on information on a disparity in stereo images acquired from the stereo camera 310*a*.

The processor 370 can also detect and track an object based on a reflection electromagnetic wave which is formed as a result of reflection a transmission electromagnetic wave by the object. The processor 370 can, for example, calculate the distance to the object and the speed relative to the object Based on the electromagnetic wave.

Further, the processor 370 can detect and track an object based on a reflection laser light which is formed as a result of reflection of transmission laser by the object. Also, the processor 370 can, for example, calculate the distance to the object and the speed relative to the object based on the laser light.

The processor 370 can detect and track an object based on a reflection ultrasonic wave which is formed as a result of reflection of a transmission ultrasonic wave by the object. The processor 370 can, for example, calculate the distance to the object and the speed relative to the object based on the ultrasonic wave.

Further, the processor 370 can detect and track an object based on reflection infrared light which is formed as a result of reflection of transmission infrared light by the object. The processor 370 can also, for example, calculate the distance to the object and the speed relative to the object based on the infrared light.

In some embodiments, the object detection device 300 may include a plurality of processors 370 or may not include the processor 370. For example, each of the camera 310, the radar 320, the lidar 330, the ultrasonic sensor 340, and the infrared sensor 350 may include its own processor.

When the object detection device 300 does not include the processor 370, the object detection device 300 can operate under control of the controller 170 or a processor inside the vehicle 100. Also, the object detection device 300 can operate under control of the controller 170.

Further, the communication device 400 performs communication with an external device. Here, the external device may be a nearby vehicle, a mobile terminal, or a server. To perform communication, the communication device 400 may include at least one of a transmission antenna, a reception antenna, a Radio Frequency (RF) circuit capable of implementing various communication protocols, and an RF device.

The communication device 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470. In some embodiments, the communication device 400 may further include other components in addition to the aforementioned components, or may not include some of the aforementioned components.

The short-range communication unit 410 performs short-range communication. The short-range communication unit 410 can support short-range communication using at least one of Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

In addition, the short-range communication unit 410 can form wireless area networks to perform short-range communication between the vehicle 100 and at least one external device. Further, the location information unit 420 can acquire location information of the vehicle 100 and may include a Global Positioning System (GPS) module or a Differential Global Positioning System (DGPS) module, for example.

The V2X communication unit 430 performs wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 performs communication with an external device through the medium of light. The optical communication unit 440 includes a light emitting unit, which converts an electrical signal into an optical signal and transmits the optical signal to the outside, and a light receiving unit which converts a received optical signal into an electrical signal. In some embodiments, the light emitting unit may be integrally formed with a lamp provided included in the vehicle 100.

The broadcast transmission and reception unit 450 can receive a broadcast signal from an external broadcasting management server or transmit a broadcast signal to the broadcasting management server through a broadcasting channel. The broadcasting channel may include a satellite channel, and a terrestrial channel, and the broadcast signal may include a TV broadcast signal, a radio broadcast signal, and a data broadcast signal.

The ITS communication unit 460 can exchange information, data, or signals with a traffic system and provide acquired information or data to the traffic system. The ITS communication unit 460 can also receive information, data, or signals from the traffic system. For example, the ITS communication unit 460 can receive traffic volume information from the traffic system and provide the traffic volume information to the controller 170. In another example, the ITS communication unit 460 can receive a control signal from the traffic system, and provide the control signal to the controller 170 or a processor provided in the vehicle 100.

In addition, the processor 470 can control the overall operation of each unit of the communication device 400. In some embodiments, the communication device 400 may include a plurality of processors 470, or may not include the processor 470. When the communication device 400 does not include the processor 470, the communication device 400 can operate under control of the controller 170 or a processor of a device inside of the vehicle 100.

In addition, the communication device 400 can implement a vehicle display device, together with the user interface device 200. In this instance, the vehicle display device can be referred to as a telematics device or an Audio Video Navigation (AVN) device. The communication device 400 can operate under control of the controller 170.

Further, the driving maneuvering device 500 can receive a user input for driving the vehicle 100. In the manual mode, the vehicle 100 can operate based on a signal provided by the maneuvering device 500. The maneuvering device 500 may include a steering input device 510, an acceleration input device 530, and a brake input device 570.

In more detail, the steering input device 510 can receive a user input with regard to the direction of travel of the vehicle 100. For example, the steering input device 510 may take the form of a wheel to enable a steering input through the rotation thereof. In some embodiments, the steering input device may be provided as a touchscreen, a touch pad, or a button.

In addition, the acceleration input device 530 can receive a user input for acceleration of the vehicle 100, and the brake input device 570 can receive a user input for deceleration of the vehicle 100. Each of the acceleration input device 530 and the brake input device 570 may take the form of a pedal. In some embodiments, the acceleration input device or the break input device may be configured as a touch screen, a touch pad, or a button. The maneuvering device 500 can also operate under control of the controller 170.

The vehicle drive device 600 electrically controls the operation of various devices of the vehicle 100. In more detail, the vehicle drive device 600 may include a power train drive unit 610, a chassis drive unit 620, a door/window drive unit 630, a safety apparatus drive unit 640, a lamp drive unit 650, and an air conditioner drive unit 660. In some embodiments, the vehicle drive device 600 may further include other components in addition to the aforementioned components, or may not include some of the aforementioned components. In addition, the vehicle drive device 600 may include a processor, and each unit of the vehicle drive device 600 may include its own processor.

Further, the power train drive unit 610 controls the operation of a power train and may include a power source drive unit 611 and a transmission drive unit 612. The power source drive unit 611 can control a power source of the vehicle 100.

When a fossil fuel-based engine is the power source, the power source drive unit 611 performs electronic control of the engine. As such the power source drive unit 611 can control, for example, the output torque of the engine. The power source drive unit 611 can also adjust the output toque of the engine under control of the controller 170.

When an electric motor is the power source, the power source drive unit 611 can control the motor. The power source drive unit 611 can control, for example, the RPM and toque of the motor under control of the controller 170.

The transmission drive unit 612 controls the transmission and can adjust the state of the transmission. For example, the transmission drive unit 612 can adjust a state of the transmission to a drive (D), reverse (R), neutral (N), or park (P) state. When an engine is the power source, the transmission drive unit 612 can adjust a gear-engaged state to the drive position D.

Further, the chassis drive unit 620 controls the operation of a chassis and can include a steering drive unit 621, a brake drive unit 622, and a suspension drive unit 623. The steering drive unit 621 performs electronic control of a steering apparatus provided inside the vehicle 100. The steering drive unit 621 can also change the direction of travel of the vehicle 100.

In addition, the brake drive unit 622 performs electronic control of a brake apparatus provided inside the vehicle 100. For example, the brake drive unit 622 can reduce the speed of the vehicle 100 by controlling the operation of a brake located at a wheel. In addition, the brake drive unit 622 can control a plurality of brakes individually and also apply a different degree-braking force to each wheel.

The suspension drive unit 623 performs electronic control of a suspension apparatus inside the vehicle 100. For example, when the road surface is uneven, the suspension drive unit 623 can control the suspension apparatus so as to reduce the vibration of the vehicle 100. In addition, the suspension drive unit 623 can also control a plurality of suspensions individually.

Further, the door/window drive unit 630 performs electronic control of a door apparatus or a window apparatus inside the vehicle 100. The door/window drive unit 630 may include a door drive unit 631 and a window drive unit 632.

The door drive unit 631 controls the door apparatus and can control opening or closing of a plurality of doors included in the vehicle 100. The door drive unit 631 can also control opening or closing of a trunk or a tail gate and control opening or closing of a sunroof.

In addition, the window drive unit 632 performs electronic control of the window apparatus and can control opening or closing of a plurality of windows included in the vehicle 100. Also, the safety apparatus drive unit 640 performs electronic control of various safety apparatuses provided inside the vehicle 100. In more detail, the safety apparatus drive unit 640 can include an airbag drive unit 641, a safety belt drive unit 642, and a pedestrian protection equipment drive unit 643.

In addition, the airbag drive unit 641 performs electronic control of an airbag apparatus inside the vehicle 100. For example, upon detection of a dangerous situation, the airbag drive unit 641 can control an airbag to be deployed. Also, the safety belt drive unit 642 performs electronic control of a seatbelt apparatus inside the vehicle 100. For example, upon detection of a dangerous situation, the safety belt drive unit 642 can control passengers to be fixed onto seats 110FL, 110FR, 110RL, and 110RR with safety belts.

Further, the pedestrian protection equipment drive unit 643 performs electronic control of a hood lift and a pedestrian airbag. For example, upon detection of a collision with a pedestrian, the pedestrian protection equipment drive unit 643 can control a hood lift and a pedestrian airbag to be deployed.

The lamp drive unit 650 performs electronic control of various lamp apparatuses provided inside the vehicle 100, and the air conditioner drive unit 660 performs electronic control of an air conditioner inside the vehicle 100. For example, when the inner temperature of the vehicle 100 is high, the air conditioner drive unit 660 can operate the air conditioner so as to supply cool air to the inside of the vehicle 100.

The vehicle drive device 600 may include a processor, and each unit of the vehicle dive device 600 may include its own processor. The vehicle drive device 600 can also operate under control of the controller 170.

Further, the vehicle operation system 700 is a system for controlling the overall driving operation of the vehicle 100 and can operate in the autonomous driving mode. The vehicle operation system 700 may include the driving system 710, the pulling-out system 740, and the parking system 750.

In addition, the vehicle operation system 700 may further include other components in addition to the aforementioned components, or may not include some of the aforementioned component. Further, the vehicle operation system 700 may include a processor, and each unit of the vehicle operation system 700 may include its own processor.

When the vehicle operation system 700 is implemented as software, the vehicle operation system 700 may be a subordinate concept of the controller 170. In addition, the vehicle operation system 700 may be a concept including at least one of the user interface apparatus 270, the object detection device 300, the communication device 400, the driving maneuvering device 500, the vehicle drive device 600, the navigation system 770, the sensing unit 120, and the controller 170.

Further, the driving system 710 performs driving of the vehicle 100 by providing a control signal to the vehicle drive device 600 based on navigation information from the navigation system 770. The driving system 710 can also perform driving of the vehicle 100 by providing a control signal to the vehicle drive device 600 based on information on an object received from the object detection device 300. In addition, the driving system 710 can also perform driving of the vehicle 100 by providing a control signal to the vehicle drive device 600 based on a signal from an external device through the communication device 400.

The driving system 710 includes at least one of the user interface apparatus 270, the object detection device 300, the communication device 400, the driving maneuvering device 500, the vehicle driving device 600, the navigation system 770, the sensing unit 120, and the controller 170, and which performs driving of the vehicle 100. The driving system 710 may be referred to as a vehicle driving control apparatus.

Further, the pulling-out system 740 performs an operation of pulling the vehicle 100 out of a parking space, by providing a control signal to the vehicle drive device 600 based on navigation information from the navigation system 770. The pulling-out system 740 can also perform an operation of pulling the vehicle 100 out of a parking space, by providing a control signal to the vehicle drive device 600 based on information on an object received from the object detection device 300.

In addition, the pulling-out system 740 can perform an operation of pulling the vehicle 100 out of a parking space, by providing a control signal to the vehicle drive device 600 based on a signal received from an external device. The pulling-out system 740 includes at least one of the user interface device 270, the object detection device 300, the communication device 400, the driving maneuvering device 500, the vehicle driving device 600, the navigation system 770, the sensing unit 120, and the controller 170, and which performs an operation of pulling the vehicle 100 out of a parking space. The pulling-out system 740 may be referred to as a vehicle pulling-out control apparatus.

Further, the parking system 750 performs an operation of parking the vehicle 100 in a parking space, by providing a control signal to the vehicle drive device 600 based on navigation information from the navigation system 770. The parking system 750 can also perform an operation of parking the vehicle 100 in a parking space, by providing a control signal to the vehicle drive device 600 based on information on an object received from the object detection device 300. The parking system 750 can further perform an operation of parking the vehicle 100 in a parking space, by providing a control signal to the vehicle drive device 600 based on a signal from an external device.

The parking system 750 may be a system which includes at least one of the user interface apparatus 270, the object detection device 300, the communication device 400, the driving maneuvering device 500, the vehicle driving device 600, the navigation system 770, the sensing unit 120, and the controller 170, and which performs an operation of parking the vehicle 100. The parking system 750 may be referred to as a vehicle parking control apparatus.

In addition, the navigation system 770 can provide navigation information including at least one of map information, information on a set destination, information on a route to the set destination, information on various objects along the route, lane information, and information on a current location of the vehicle. The navigation system 770 may include a memory and a processor and the memory can store navigation information. Further, the processor can control the operation of the navigation system 770.

In addition, the navigation system 770 can update pre-stored information by receiving information from an external device through the communication device 400. The navigation system 770 may also be a subordinate element of the user interface device 200.

Further, the sensing unit 120 can sense the state of the vehicle and may include an Inertial Navigation Unit (IMU) sensor, a collision sensor, a wheel sensor, a speed sensor, a gradient sensor, a weight sensor, a heading sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

In addition, the IMU sensor may include at least one of an accelerometer, a gyro sensor, and a magnetic sensor. The sensing unit 120 can also acquire sensing signals with regard to, for example, vehicle attitude information, vehicle motion information, vehicle yaw information, vehicle roll information, vehicle pitch information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS). The sensing unit 120 can generate vehicle state information based on sensing data. For example, the vehicle state information can be generated based on data sensed by various sensors provided inside the vehicle 100.

That is, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

In addition, the interface 130 serves as a passage for various kinds of external devices that are connected to the vehicle 100. For example, the interface 130 may have a port that is connectable to a mobile terminal and be connected to the mobile terminal via the port. In this instance, the interface 130 can exchange data with the mobile terminal.

The interface 130 can also serve as a passage for the supply of electrical energy to a mobile terminal connected thereto. When the mobile terminal is electrically connected to the interface 130, the interface 130 can provide electrical energy, supplied from the power supply unit 190, to the mobile terminal under control of the controller 170.

The memory 140 is electrically connected to the controller 170 and can store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170. In addition, the memory 140 may be integrally formed with the controller 170, or may be provided as an element of the controller 170.

In addition, the controller 170 controls the overall operation of each unit inside the vehicle 100 and may be referred to as an Electronic Controller (ECU). Also, the power supply unit 190 can supply power required to operate each component under control of the controller 170. In particular, the power supply unit 190 can receive power from, for example, a battery inside the vehicle 100.

One or more processors and the controller 170 included in the vehicle 100 can be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Figure 8A:
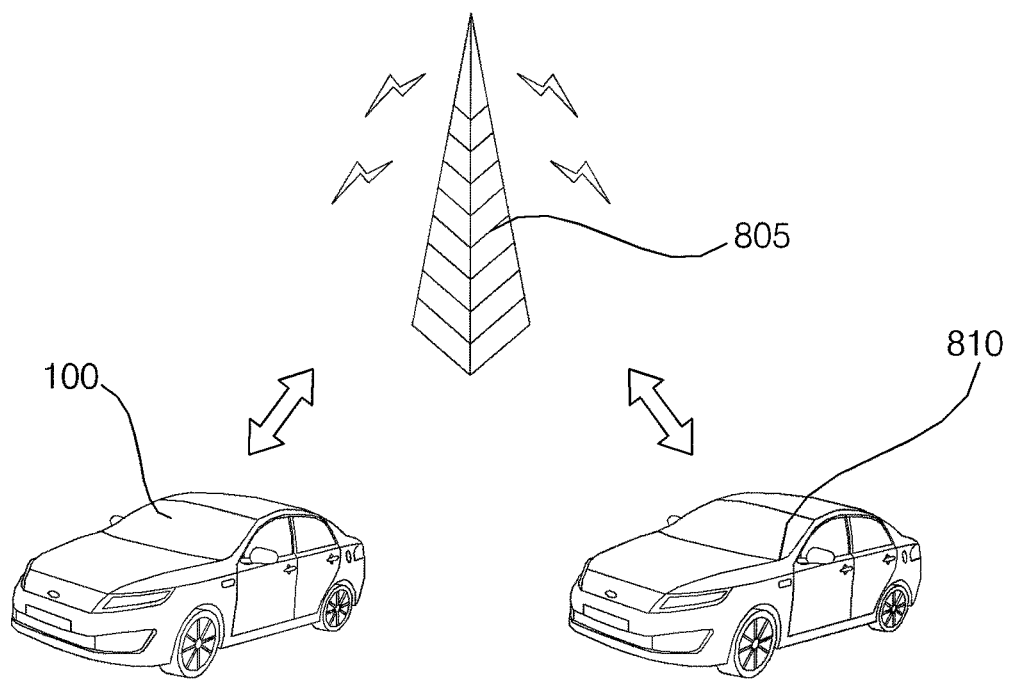
FIGS. 8A and 8B are diagrams illustrating a V2X communication system according to an embodiment of the present invention.
Figure 8B:
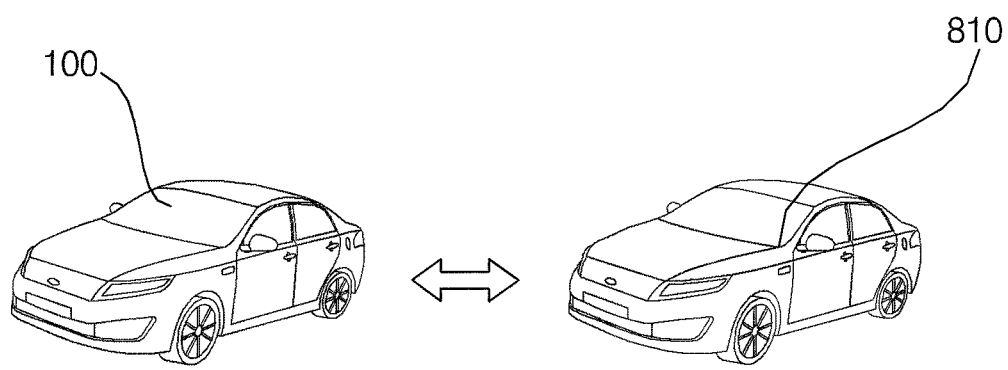

Next, FIGS. 8A and 8B are diagrams illustrating a V2X communication system according to an embodiment of the present invention. As illustrated in FIG. 8A, the vehicle 100 performs V2X communication with a nearby vehicle 810 through the communication device 400 by using a base station 805 as a medium. The base station 805 may be a concept including a Road Side Unit (RSU).

As illustrated in FIG. 8B, the vehicle 100 can directly perform V2X communication with the nearby vehicle 810 through the communication device 400. The vehicle 100 performs V2X communication with the nearby vehicle 810 using a first communication technology and/or a second communication technology.

The first communication technology mentioned throughout this specification may be a V2X technology defined in IEEE802.11p. For example, the first communication technology may be Intelligent Transportation System (ITS)-G5 technology or Wireless Access in Vehicular Environment (WAVE) technology. The second communication technology mentioned throughout this specification may be a mobile communication technique. For example, the second communication technology may be 5G technology or Long-Term Evolution (LTE) technology.

Also, both of the first and second communication technologies may use a frequency in a first band. In this instance, the first communication technology can utilize a frequency in a first sub-band, and the second communication technology can utilize a frequency in a second sub-band. The first sub-band and the second sub-band may be included in the first band.

In addition, the first communication technology and the second communication technology may coexist in a first band. The first communication technology may use a frequency in a first sub-band, and the second communication technology may use a frequency in a second sub-band. The first sub-band and the second sub-band may be included in the first band.

In addition, the first communication technology and the second communication technology use a same frequency in a first band. Also, the first communication technology can utilize a frequency in a first band, and the second communication technology can utilize a frequency in a second band.

Figure 9:
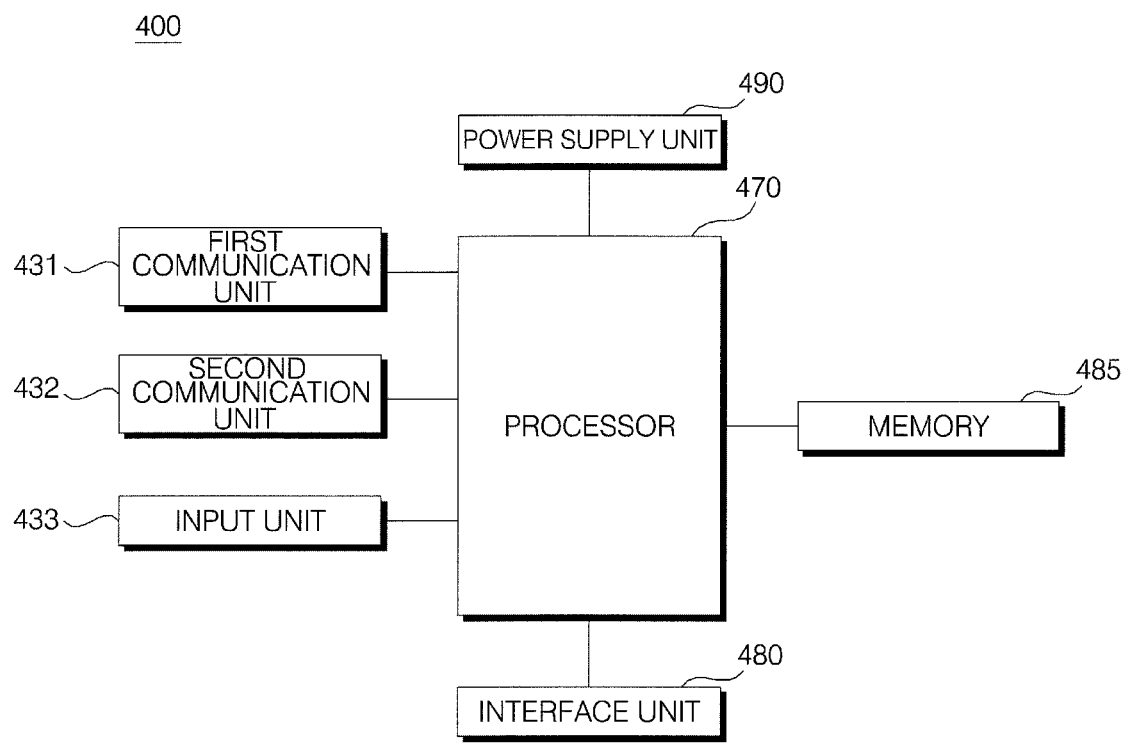
FIG. 9 is a diagram illustrating configuration of a communication apparatus for vehicle according to an embodiment of the present invention.

Next, FIG. 9 is a diagram illustrating a communication device 400 for a vehicle according to an embodiment of the present invention. The communication device 400 can communicate with at least one of a nearby vehicle, infrastructure, and a mobile terminal.

Basic Concept:

There are N-number (1, 2, 3, 4, 5, 6, 7, . . . N) of standard or non-standard (implementation specific) V2X messages to be transmitted by the processor 470 periodically or aperiodically in regular or irregular intervals from a vehicle or infrastructure or mobile terminal to a vehicle or infrastructure or mobile terminal.

The communication device 400 has the following features.

1. Communication System includes two or more communication interface units where each communication interface unit uses the same communication method (for example all interfaces use IEEE802.11p-based communication method) or different communication methods (primary interface uses IEEE802.11p-based communication method, secondary interface uses 5G/LTE-based communication method, tertiary interface uses IEEE802.11z, quaternary interface uses IEEE802.11ac and so on).

2. Message Synchronization System that dynamically manages the:

a. Transmission of standard and non-standard (implementation specific messages) messages simultaneously or alternatively or sequentially or randomly by splitting/distributing the overall transmission rate over the multiple communication interface units based on specific message distribution policy for each communication interface.

b. Reception of standard and non-standard (implementation specific) messages over multiple communication interfaces, and time-synchronizing and merging the incoming messages of the same source (vehicle or infrastructure device or mobile terminal) using the unique identifier assigned to each message by the source based on its message distribution policy c. Selection of various message distribution policies generated from the following major transmission categories for each road traffic context and wireless channel condition for reliable communication:

i) Simultaneous Transmission: All the incoming messages from the upper layer are transmitted over all communication interface units simultaneously.

ii) Alternate Transmission: Every incoming message from the upper layer is transmitted over every other communication interface unit and it is repeated from the first communication interface unit when no communication interface unit left without transmission in the current cycle of transmission.

iii) Sequential Transmission: The incoming messages from upper layer are transmitted over the available communication interfaces in a specific communication interface selection sequence. For example, consider a message set {1, 2, 3, 4, . . . , N} to be transmitted over three communication interfaces. One particular communication interface selection sequence for transmission is {1, 2, 3, 3, 1, 2, 3, 3, 1, 2, 3, 3 . . . } where the 1st, 5th, 9th, 13th, . . . messages are transmitted over the primary communication interface, 2nd, 6th, 10th, 14th, . . . messages are transmitted over the secondary communication interface and 3rd, 4th, 7th, 8th, 11th, 12th, 15th, 16th, . . . messages are transmitted over the tertiary communication interface.

iv) Random Transmission: The incoming messages from the upper layers are randomly transmitted over selected communication interfaces from all the available communication interfaces for random time periods or selected time period.

Referring to FIG. 9, the communication device 400 may include a first communication unit 431, a second communication unit 432, an input unit 433, a processor 470, an interface unit 480, a memory 485, and a power supply unit 490. The first communication unit 431 can communicate with at least one of a nearby vehicle, infrastructure, and a mobile terminal and can transmit a first transmission signal to at least one of the nearby vehicle, the infrastructure, and the mobile terminal.

For example, the first communication unit 431 can transmit the first transmission signal using the first communication technology. The first communication unit 431 can also transmit the first transmission signal using the second communication technology. Further, the first communication unit 431 can receive a first receipt signal from at least one of the nearby vehicle, the infrastructure, and the mobile terminal. For example, the first communication unit 431 can receive the first receipt signal using the first communication technology. The first communication unit 431 can also receive the first receipt signal using the second communication technology.

In addition, the first communication unit 431 includes a transmitting unit and a receiving unit and includes a Radio Frequency (RF) circuit that implements the transmitting unit and the receiving unit. The first communication unit 431 may use 802.11p-based PHY/MAC communication method ITS-G5 (Intelligent Transportation System-G5) system in European region or WAVE (Wireless Access in Vehicular Environment) system in United States/Korea regions.

The second communication unit 432 can also communicate with at least one of the nearby vehicle, the infrastructure, and the mobile terminal, and can transmit a second transmission signal to at least one of the nearby vehicle, the infrastructure, and the mobile terminal. For example, the second communication unit 432 can transmit the second transmission signal using the first communication technology. The second communication unit 432 can also transmit the second transmission signal using the second communication technology.

In addition, the second communication unit 432 can receive a second receipt signal from at least one of the nearby vehicle, the infrastructure, and the mobile terminal. For example, the second communication unit 432 can receive the second receipt signal using the first communication technology. The second communication unit 432 can also receive the second receipt signal using the second communication technology. The second communication unit 432 includes a transmitting unit and a receiving unit and an RF circuit that implements the transmitting unit and the receiving unit.

The second communication unit 432 may include 5G/LTE (fifth Generation/long-term evolution) system comprising both PC5 and Uu Interfaces. The first communication unit 431 and the second communication unit 432 may use different PHY/MAC communication methods for communication. In addition, the first communication unit 431 and the second communication unit 432 may use the same PHY/MAC communication method for communication. The communication device 400 can also handle either ad-hoc communication or infrastructure-based communications or both.

Further, the input unit 433 can receive a user input and generate a signal based on the user input. The signal generated by the input unit 433 can then be provided to the processor 470.

The processor 470 is electrically connected to each unit of the communication device 400 and can control an overall operation of each unit of the communication device 400. The processor 470 can also control the first communication unit 431 to transmit a first transmission signal to at least one of the nearby vehicle, the infrastructure, and the mobile terminal, for example.

Further, the processor 470 can control the first communication unit 431 to transmit a first transmission signal at a first period. The processor 470 can also change the first period and can control the first communication unit 431 to receive a first receipt signal from at least one of the nearby vehicle, the infrastructure, and the mobile terminal.

In addition, the processor 470 can control the first communication unit 431 to receive the first receipt signal at the first period. The processor 470 can also change the first period. The processor 470 can also control the second communication unit 432 to transmit a second transmission signal to at least one of the nearby vehicle, the infrastructure, and the mobile terminal.

The processor 470 can also control the second communication unit 432 to transmit a second transmission signal at a second period. In addition, the processor 470 can change the second period. The processor 470 can also control the second communication unit 432 to receive the second transmission signal from at least one of the nearby vehicle, the infrastructure, and the mobile terminal. The processor 470 can control the second communication unit 432 to receive a second receipt signal at the second period and change the second period.

Based on at least one of the first transmission signal and the second transmission signal, the processor 470 can transmit a first message to at least one of the nearby vehicle, the infrastructure, and the mobile terminal. In more detail, the first message may be a transmission message and include at least one of: a Basic Safety Message (BSM), a Cooperative Awareness Message (CAM), a Decentralized Environmental Notification Message (DENM), Signal Phase and Timing (SPaT), MAP data, a Signal Request Message (SRM), and a Signal Status Message (SSM).

Based on the first receipt signal and the second receipt signal, the processor 470 can receive a second message from at least one of the nearby vehicle, the infrastructure, and the mobile terminal. The second message may be a receipt message and include at least one of: a Basic Safety Message (BSM), a Cooperative Awareness Message (CAM), a Decentralized Environmental Notification Message (DENM), Signal Phase and Timing (SPaT), MAP data, a Signal Request Message (SRM), and a Signal Status Message (SSM).

Further, the processor 470 can transmit the first message through the first communication unit and the second communication unit simultaneously. The processor 470 can also transmit the first message through the first communication unit and the second communication unit alternatively. The processor 470 can also transmit the first message through the first communication unit and the second communication unit sequentially or transmit the first message through the first communication unit and the second communication unit randomly.

In addition, the processor 470 may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Further, the interface unit 480 can exchange information, data, or a signal with a different device included in the vehicle 100. The interface unit 480 can receive information, data, or a signal from a different device included in the vehicle 100. The interface unit 480 can also transmit received information, data, or a signal to the processor 470. The interface unit 480 can further transmit information, data, or a signal, which is generated or processed by the processor 270, to a different device included in the vehicle 100.

The interface unit 480 can receive information, data, or a signal from the user interface device 200, the object detection device 300, and the sensing unit 120. In addition, the memory 485 is electrically connected to the controller 170 and can store basic data for each unit, control data for the operational control of each unit, and input/output data. The memory 485 can be any of various hardware storage devices, such as a ROM, a RAM, an EPROM, a flash drive, and a hard drive. Further, the memory 485 can store various data for the overall operation of the communication device 400, such as programs for the processing or control of the processor 470. In addition, the memory 485 may be integrally formed with the processor 470, or may be implemented as a subordinate element of the processor 470.

In addition, the power supply unit 490 can supply power required to operate each component under control of the processor 470. In particular, the power supply unit 290 can receive power from, for example, a battery inside the vehicle 100. In addition, the communication device 400 may include a processing board on which the first communication unit 431, the second communication unit 432, and the processor 470 are disposed.

Figure 10:
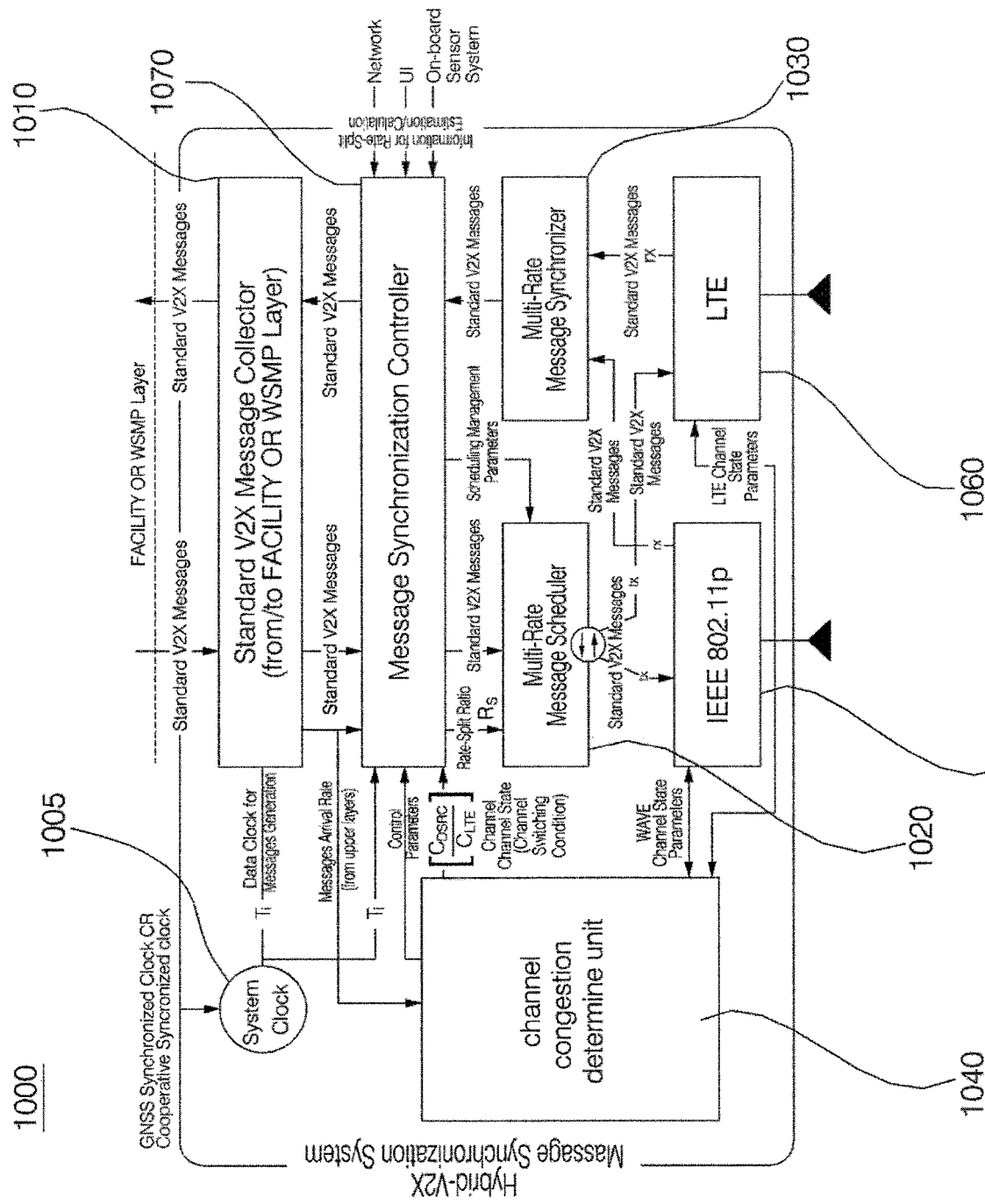
FIG. 10 is a block diagram illustrating a message synchronization system according to an embodiment of the present invention.

Next, FIG. 10 is a block diagram illustrating a message synchronization system according to an embodiment of the present invention. Referring to FIG. 10, the processor 470 may include a message synchronization system 1000. The message synchronization system 1000 can determine processing of the first transmission signal, the second transmission signal, the first receipt signal, and the second receipt signal. As shown, the message synchronization system 1000 may include: a V2X message collector 1010, a multi-rate message scheduler 1020, a multi-rate message synchronizer 1030, a channel congestion determination unit 1040, a first signal processing unit 1050, a second signal processing unit 1060, and a message synchronization controller 1070.

The V2X message collector 1010 can queue messages from an upper layer. For example, the upper layer may be a facilities layer. In another example, the upper layer may be a Wave Short Message Protocol (WSMP) layer. Also, the V2X message collector 1010 can calculate a message arrival rate from the upper layer and provide the message arrival rate to the channel congestion determination unit 1040.

The V2X message collector 1010 can also queue messages from a lower layer. The lower layer may be the message synchronization controller 1070. The V2X message collector 1010 can transmit a message to a corresponding constituent element in an upper layer standard stack. The V2X message collector 1010 can also receive data clock data from the system clock 1005 to generate a message.

Further, the multi-rate message scheduler 1020 can split a message according to a transmission rate determined by the message synchronization controller 1070, and transmit the split messages to the first signal processing unit 1050 and the second signal processing unit 1060. Based on a splitting rate calculated by the message synchronization controller 1070, the multi-rate message scheduler 1020 can split a message to be transmitted to the first signal processing unit 1050 and the second signal processing unit 1060.

The multi-rate message synchronizer 1030 can synchronize and merge the first receipt signal from the first communication unit 431 and the second receipt signal from the second communication unit 432. The multi-rate message synchronizer 1030 can also synchronize signals received from the first communication unit 431 and the second communication unit 432 for merging.

Further, the channel congestion determination unit 1040 can estimate a channel congestion of the first communication unit 431 and the second communication unit 432. The channel congestion determination unit 140 can determine the channel congestion of the first communication technology and the second communication technology. To successfully transmit and receive a message, the channel congestion determination unit 1040 can also estimate a channel capacity ratio and a bandwidth availability ration.

In addition, the first signal processing unit 1050 can process a signal for transmitting and receiving a message based on the first communication technology, and the signal processed by the first signal processing unit 1050 can be provided to the first communication unit 431. The second signal processing unit 1060 can process a signal for transmitting and receiving a message based on the second communication technology. The signal processed by the second signal processing unit 1060 can then be provided to the second communication unit 432.

The message synchronization controller 1070 can determine a message switching rate based on information sources, channel congestion, a channel capacity ratio, and a bandwidth availability ration. In more detail, the message synchronization controller 1070 can determine a transmission period of each of the first transmission signal and the second transmission signal. The message synchronization controller 1070 can also determine a first period for the first transmission signal.

Further, the message synchronization controller 1070 can change the first period and determine a second period for the second transmission signal. The message synchronization controller 1070 can also change the second period and determine a transmission rate of each of the first transmission signal and the second transmission signal.

The message synchronization controller 1070 can determine a transmission rate of the first transmission signal. For example, the message synchronization controller 1070 can determine a transmission rate of the first transmission signal per unit time. Also, the message synchronization controller 1070 can determine a transmission rate of the second transmission signal. For example, the message synchronization controller 1070 can determine a transmission rate of the second transmission signal per unit time.

In addition, the message synchronization controller 1070 can determine a first redundancy rate of a message to be transmitted based on the first transmission signal and can determine a second redundancy rate of a message to be transmitted based on the second transmission signal. Further, the message synchronization controller 1070 can determine a data capacity ratio of each of the first communication technology and the second communication technology, based on the channel congestion determined by the channel congestion determination unit 1040. The message synchronization controller 1070 can also determine a transmission rate of each of the first transmission signal and the second transmission signal, based on information on the data capacity ratio.

Further, the message synchronization controller 1070 can determine a spectral efficiency for each of the first communication technology and the second communication technology, based on the channel congestion determined by the channel congestion determination unit 1040. Also, the message synchronization controller 1070 can determine a transmission rate of each of the first transmission signal and the second transmission signal, based on information on a frequency band.

Further, the message synchronization controller 1070 can make a determination so that a first message is transmitted through the first transmission signal at a first period and make a determination so that a second message is transmitted at a second period through the second transmission signal. The message synchronization controller 1070 can also make a determination so that a second message and a third message are transmitted through the first transmission signal at a third period.

In addition, the message synchronization system 1000 can determine processing of the first transmission signal, the second transmission signal, the first receipt signal, and the second receipt signal, based on a user signal received through the input unit 433. For example, the message synchronization controller 1070 can determine processing of the first transmission signal, the second transmission signal, the first receipt signal, and the second receipt signal, based on a user signal received through the input unit 433.

In addition, the message synchronization system 1000 can determine processing of the first transmission signal, the second transmission signal, the first receipt signal, and the second receipt signal, based on sensing information received from the sensing unit 120 through the interface unit 480. Also, the message synchronization system 1000 can determine the transmission rate of the first transmission signal and the second transmission signal, based on vehicle density estimated by fusion of the user input signal, the sensing information and the network information. For example, the message synchronization controller 1070 can determine the transmission rate of the first transmission signal and the second transmission signal, based on vehicle density estimated by fusion of the user input signal, the sensing information and the network information.

Further, the message synchronization controller 1070 can determine processing of the first transmission signal, the second transmission signal, the first receipt signal, and the second receipt signal, based on sensing information received from the sensing unit 120 through the interface unit 480. Also, the message synchronization controller 1070 can determine processing of the first transmission signal, the second transmission signal, the first receipt signal, and the second receipt signal, based on information which is received from a network through at least one of the first communication unit 431 and the second communication unit 432. The message synchronization controller 1070 can also set message distribution policies.

The following example policies are given for dual-interface communication system where the first communication unit 431 and the second communication unit 432 exist.

Message Set $\{m_{t0}, m_{t1}, m_{t2}, \ldots m_{tN}\}$

Figure 11:
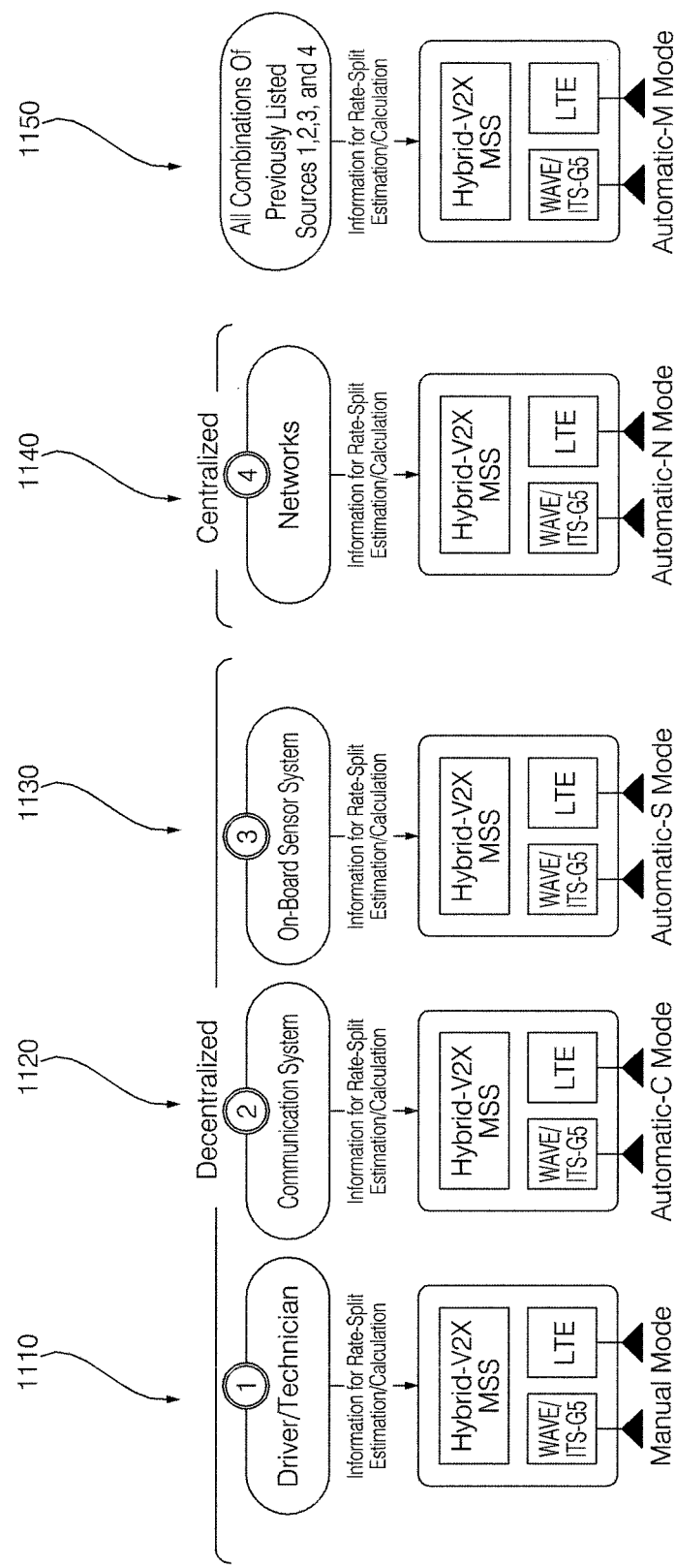
FIG. 11 is a diagram illustrating each splitting operation implemented by a first communication technology and a second communication technology according to an embodiment of the present invention.

Full-Rate on the First Communication Unit 431 Policy:
Message Set for The first communication unit 431 $\{m_{t0}, m_{t1}, m_{t2}, \ldots m_{tN}\}$
Message Set for The second communication unit 432 $\{\emptyset\}$ Full-Rate on the Second Communication Unit 432 Policy:
Message Set for The first communication unit 431 $\{\emptyset\}$
Message Set for The second communication unit 432 $\{m_{t0}, m_{t1}, m_{t2}, \ldots m_{tN}\}$ Half-Rate on the First Communication Unit 431 Policy:
Message Set for The first communication unit 431 $\{m_{t0}, m_{t2}, m_{t4}, \ldots m_{tN}\}$
Message Set for The second communication unit 432 $\{m_{t1}, m_{t3}, m_{t5}, \ldots m_{t(N-1)}, m_{t(N+1)}\}$
And vice versa for ½-Rate on The second communication unit 432 Policy ⅓-Rate on the First Communication Unit 431 Policy:
Message Set for The first communication unit 431 $\{m_{t0}, m_{t3}, m_{t6}, m_{t9}, m_{t12}, \ldots\}$
Message Set for The second communication unit 432 $\{m_{t1}, m_{t2}, m_{t4}, m_{t5}, m_{t7}, m_{t8}, \ldots\}$
And vice versa for ⅓-Rate on The second communication unit 432 Policy ¼-Rate on the First Communication Unit 431 Policy:
Message Set for The first communication unit 431 $\{m_{t0}, m_{t4}, m_{t8}, m_{t12}, m_{t16}, \ldots\}$
Message Set for The second communication unit 432 $\{m_{t1}, m_{t2}, m_{t3}, m_{t5}, m_{t6}, m_{t7}, \ldots\}$
And vice versa for ¼-Rate on The second communication unit 432 Policy ⅛-Rate on the First Communication Unit 431 Policy:
Message Set for The first communication unit 431 $\{m_{t0}, m_{t8}, m_{t16}, m_{t24}, m_{t32}, \ldots\}$
Message Set for The second communication unit 432 $\{m_{t1}, m_{t2}, m_{t3}, m_{t4}, m_{t5}, m_{t6}, m_{t7}, \ldots\}$
And vice versa for ⅛-Rate on The second communication unit 432 Policy 1/16-Rate on the First Communication Unit 431 Policy:
Message Set for The first communication unit 431 $\{m_{t0}, m_{t16}, m_{t32}, m_{t48}, m_{t64}, \ldots\}$
Message Set for The second communication unit 432 $\{m_{t1}, m_{t2}, m_{t3}, m_{t4}, \ldots, m_{t15}, m_{t17}, \ldots\}$
And vice versa for 1/16-Rate on The second communication unit 432 Policy The above message distribution policies are extended for lower rates Full-Rate Redundancy Policy (Also Used for Interoperability Policy):
  Message Set for The first communication unit 431 $\{m_{t0}, m_{t1}, m_{t2}, \ldots m_{tN}\}$
  Message Set for The second communication unit 432 $\{m_{t0}, m_{t1}, m_{t2}, \ldots m_{tN}\}$
½-Rate Redundancy on the First Communication Unit 431 Policy:
  Message Set for The first communication unit 431 $\{m_{t0}, m_{t1}, m_{t2}, m_{t3}, \ldots m_{tN}\}$
  Message Set for The second communication unit 432 $\{m_{t1}, m_{t3}, m_{t5}, \ldots \}$
  And vice versa for ½-Rate Redundancy on The second communication unit 432 Policy
¼-Rate Redundancy on the First Communication Unit 431 Policy:
  Message Set for The first communication unit 431 $\{m_{t0}, m_{t1}, m_{t2}, m_{t4}, m_{t5}, m_{t6}, m_{t8}, \ldots m_{tN}\}$
  Message Set for The second communication unit 432 $\{m_{t1}, m_{t3}, m_{t5}, m_{t7}, \ldots \}$
  And vice versa for ½-Rate Redundancy on The second communication unit 432 Policy
  The above message distribution policies are extended for lower rates
Interoperability with Dual-Interface Vehicles and the First Communication Unit 431 Only Vehicles Policy:
  Message Set for The first communication unit 431 $\{m_{t0}, m_{t1}, m_{t2}, \ldots m_{tN}\}$
  Message Set for The second communication unit 432 $\{m_{t0}, m_{t2}, m_{t4}, \ldots m_{tN}\}$
Interoperability with Dual-Interface Vehicles and the Second Communication Unit 432 Only Vehicles Policy:
  Message Set for The first communication unit 431 $\{m_{t0}, m_{t2}, m_{t4}, \ldots m_{tN}\}$
  Message Set for The second communication unit 432 $\{m_{t0}, m_{t1}, m_{t2}, \ldots m_{tN}\}$ Next, FIG. 11 is a diagram illustrating a splitting operation implemented by a first communication technology and a second communication technology according to an embodiment of the present invention. Further, the processor 470 can split a plurality of messages into messages to be transmitted using the first communication technology and messages to be transmitted using the second communication technology, and then transmit the split messages.

The processor 470 can also determine a message splitting rate of the plurality of messages. The message splitting rate may be defined as the ratio of the number of messages to be transmitted using the first communication technology compared to the number of messages to be transmitted using the second communication technology. Alternatively, the message splitting rate may be defined as the ratio of the number of messages to be transmitted using the second communication technology compared to the number of messages to be transmitted using the first communication technology.

Specifically, the message synchronization system 1000 included in the processor 470 can divide the plurality of messages into messages to be transmitted using a first communication technology and messages to be transmitted using the second communication technology. That is, the message synchronization controller 1070 included in the message synchronization system 1000 can split the plurality of messages into messages to be transmitted using the first communication technology and messages to be transmitted using the second communication technology.

As shown in the example of 1110 of FIG. 11, the processor 470 can determine a message splitting rate based on a user input received through the input unit 433. A user may be a driver or a technician. As shown in the example of 1120 of FIG. 11, the processor 470 can determine a message splitting rate based on communication information (for example, channel state information). The communication information may include channel congestion information generated by the channel congestion determination unit 1040 of the message synchronization system 1000.

As shown in the example of 1130 of FIG. 11, the processor 470 can determine a message splitting rate based on sensing information. The sensing information can received from the sensing unit through the interface unit 480. As shown in the example of 1140 of FIG. 11, the processor 470 can determine a message splitting rate based on information from a network control service provider.

The processor 470 can receive information, which acts as the basis of determination of a message splitting rate, from the first communication unit 431, the second communication unit 432, or a network server. The information may be traffic information. As shown in the example of 1150 of FIG. 11, the processor 470 can determine a message splitting rate based on a combination of the communication information, the channel congestion information, and the information from a network control service provider.

Figure 12A:
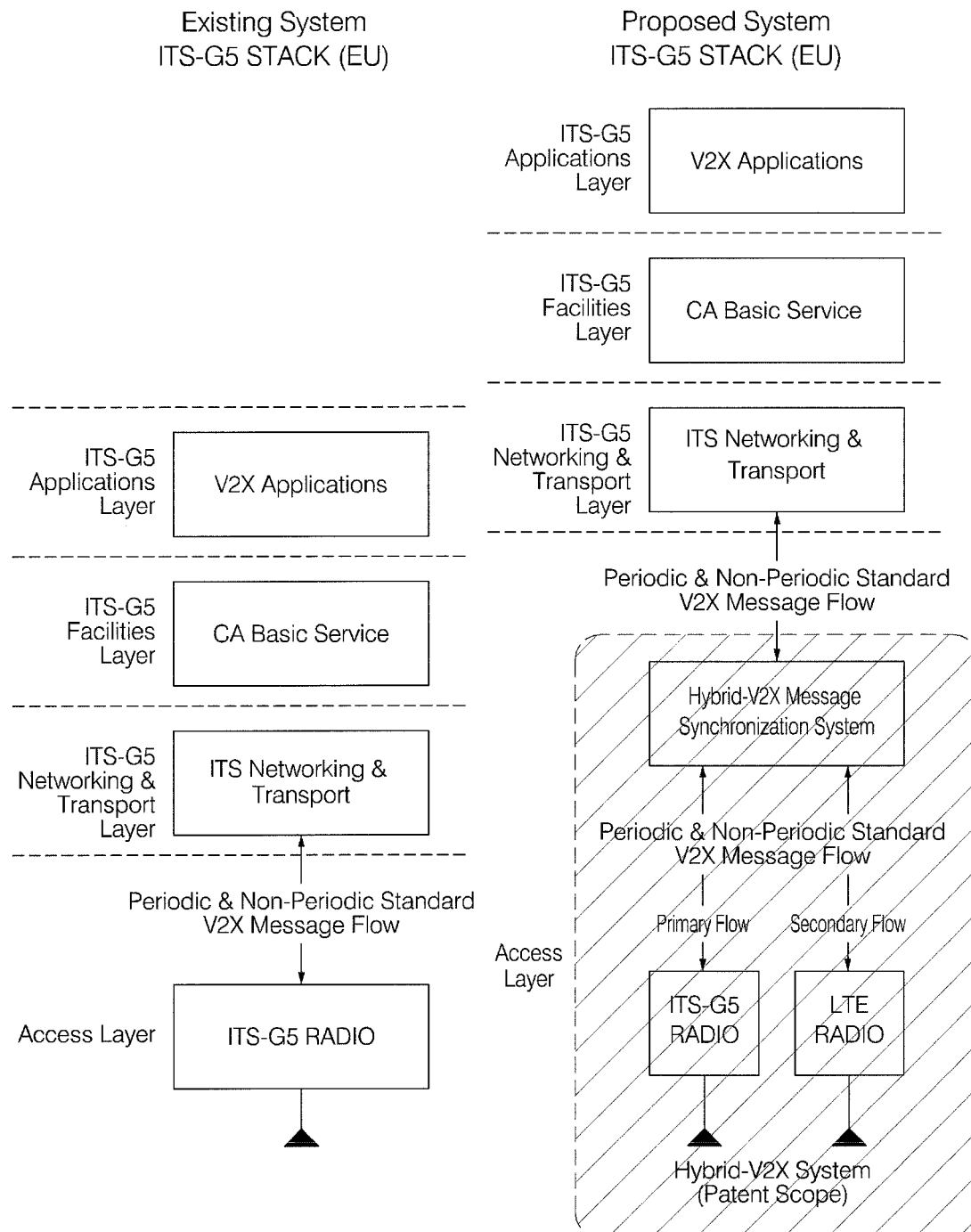
FIGS. 12A and 12B are diagrams showing comparison between an existing technology and a communication device according to an embodiment of the present invention.
Figure 12B:
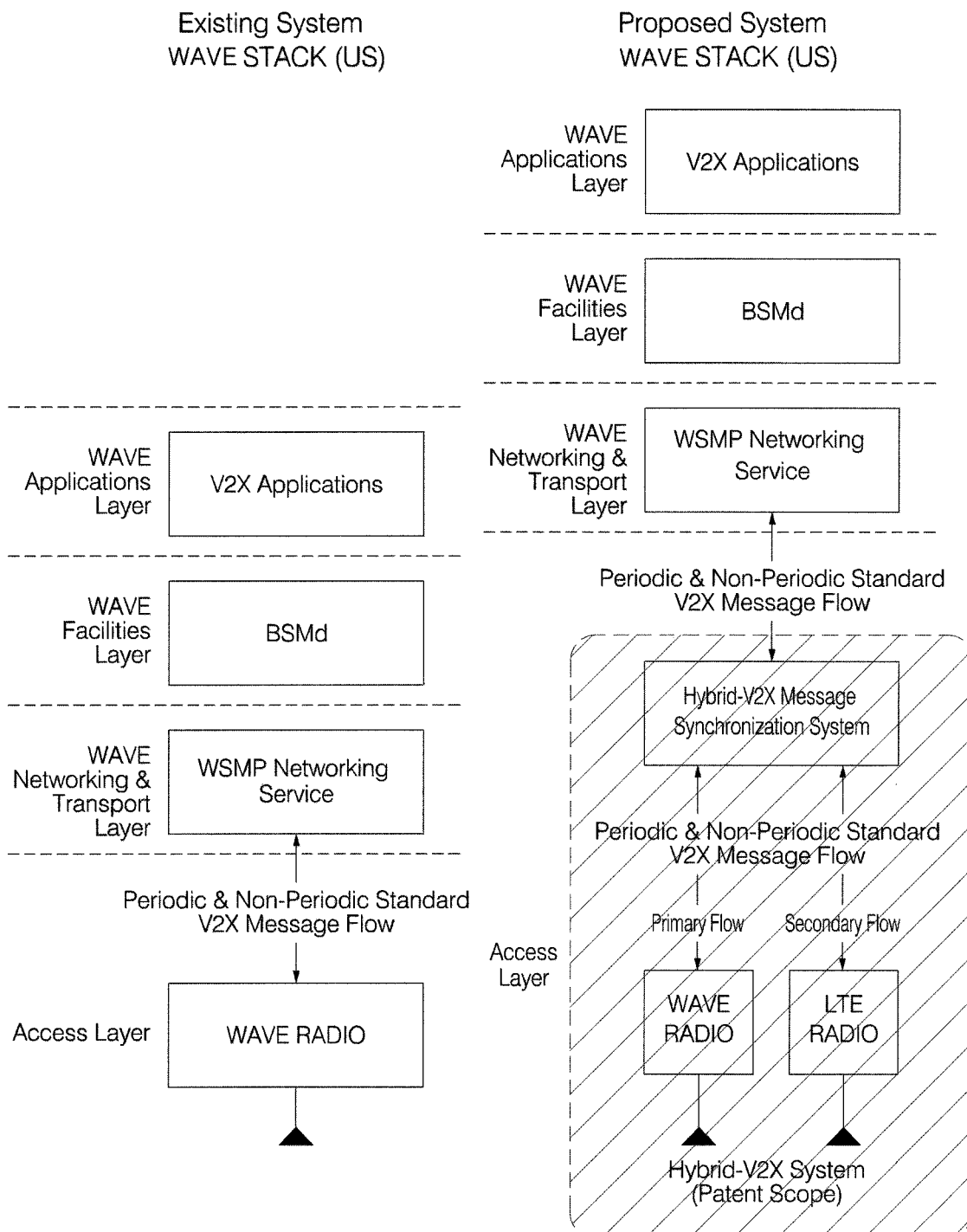

Next, FIGS. 12A and 12B are diagrams showing a comparison between an existing technology and a communication device according to an embodiment of the present invention. In particular, FIG. 12A illustrates an example of EU-type V2X communication layers, and FIG. 12B illustrates an example of US-type V2X communication layers.

Referring to FIG. 12A, the EU-type V2X communication layers includes an access layer, an ITS-G5 Networking & Transport Layer, an ITS-G5 Facilities Layer, and an ITS-G5 Application Layer in order from the bottom to the top. The message synchronization system 1000 according to an embodiment of the present invention can be applied to the access layer.

Referring to 12B, the US-type V2X communication layers includes an access layer, a WAVE Networking & Transport Layer, a WAVE Facilities Layer, and a WAVE Application Layer, which are positioned from bottom to top in order. The message synchronization system 1000 according to an embodiment of the present invention can be applied to the access layer.

Figure 13:
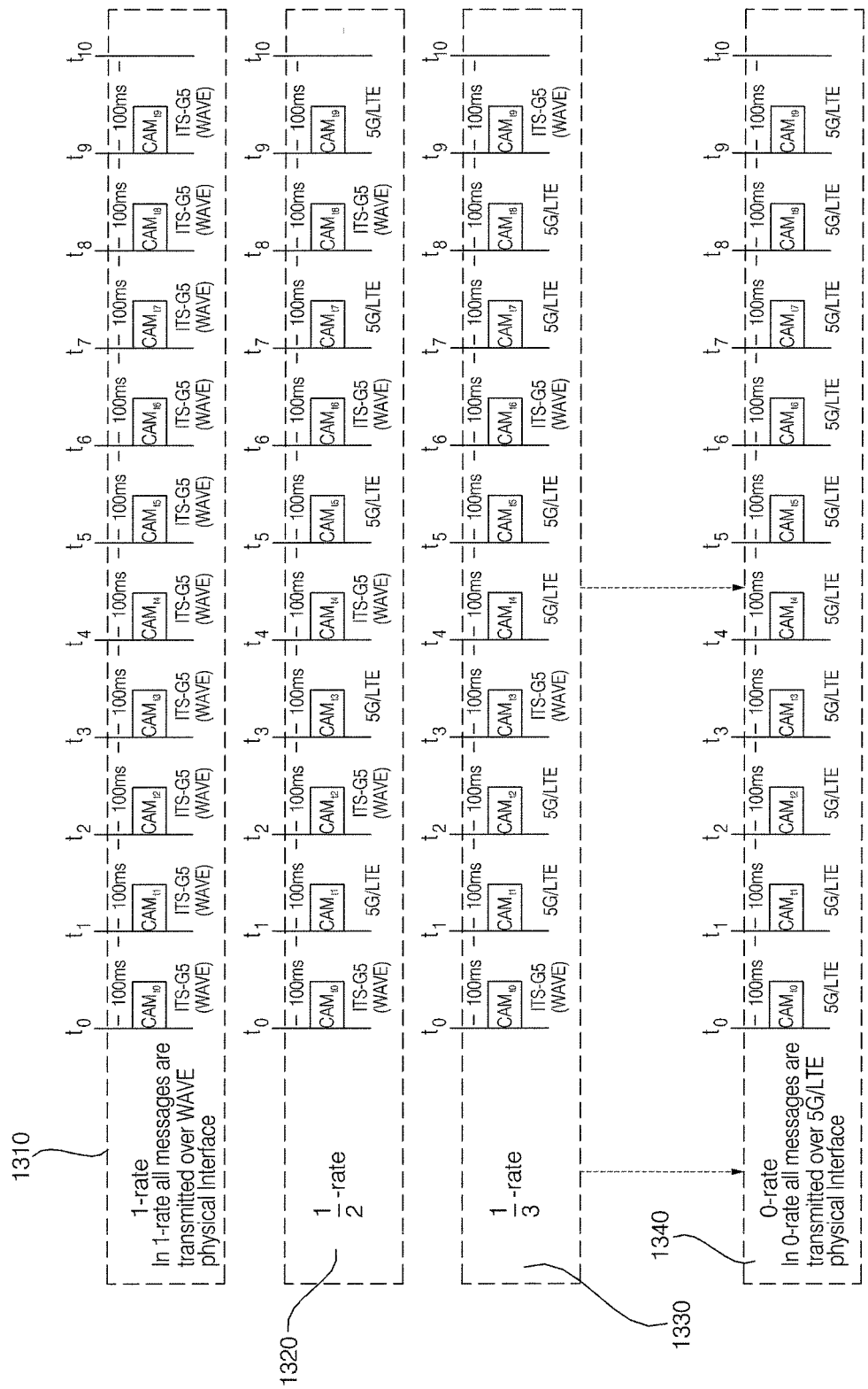
FIG. 13 is a diagram illustrating an operation of determining a usage ratio between the first communication technology and the second communication technology according to an embodiment of the present invention.

Next, FIG. 13 is a diagram illustrating an operation of determining a usage ratio between the first communication technology and the second communication technology according to an embodiment of the present invention. Referring to FIG. 13, the processor 470 can determine a usage ratio between the first communication technology and the second communication technology.

The processor 470 can determine the usage ratio between the first communication technology and the second communication technology based on at least one of a user input, communication information, sensing information, and information from a network control service provider. Further, the message synchronization system 100 included in the processor 470 can determine the usage ratio between the first communication technology and the second communication technology based on at least one of the user input, the communication information, the sensing information, and the information from a network control service provider.

The message synchronization controller 1070 included in the message synchronization system 1000 can determine the usage ratio between the first communication technology and the second communication technology based on at least one of the user input, the communication information, the sensing information, and the information from a network control service provider. The usage ratio can be defined as the number of times the second communication technology is to be used, compared to the number of times the first communication technology is to be used.

As illustrated in FIG. 13, if the usage ratio is determined to be 1-rate, the processor 470 can transmit every message using the first communication technology in 1310. If the usage ratio is determined to be ½-rate, the processor 470 can transmit a half of all messages using the first communication technology, and the other half of the messages using the second communication technology in 1320.

If the usage ratio is determined to be ⅓-rate, the processor 470 can transmit one third of all messages using the first communication technology, and two thirds of the messages using the second communication technology in 1330. If the usage ratio is determined to be 0-rate, the processor 470 can transmit all messages using the second communication technology in 1340.

Figure 14A:
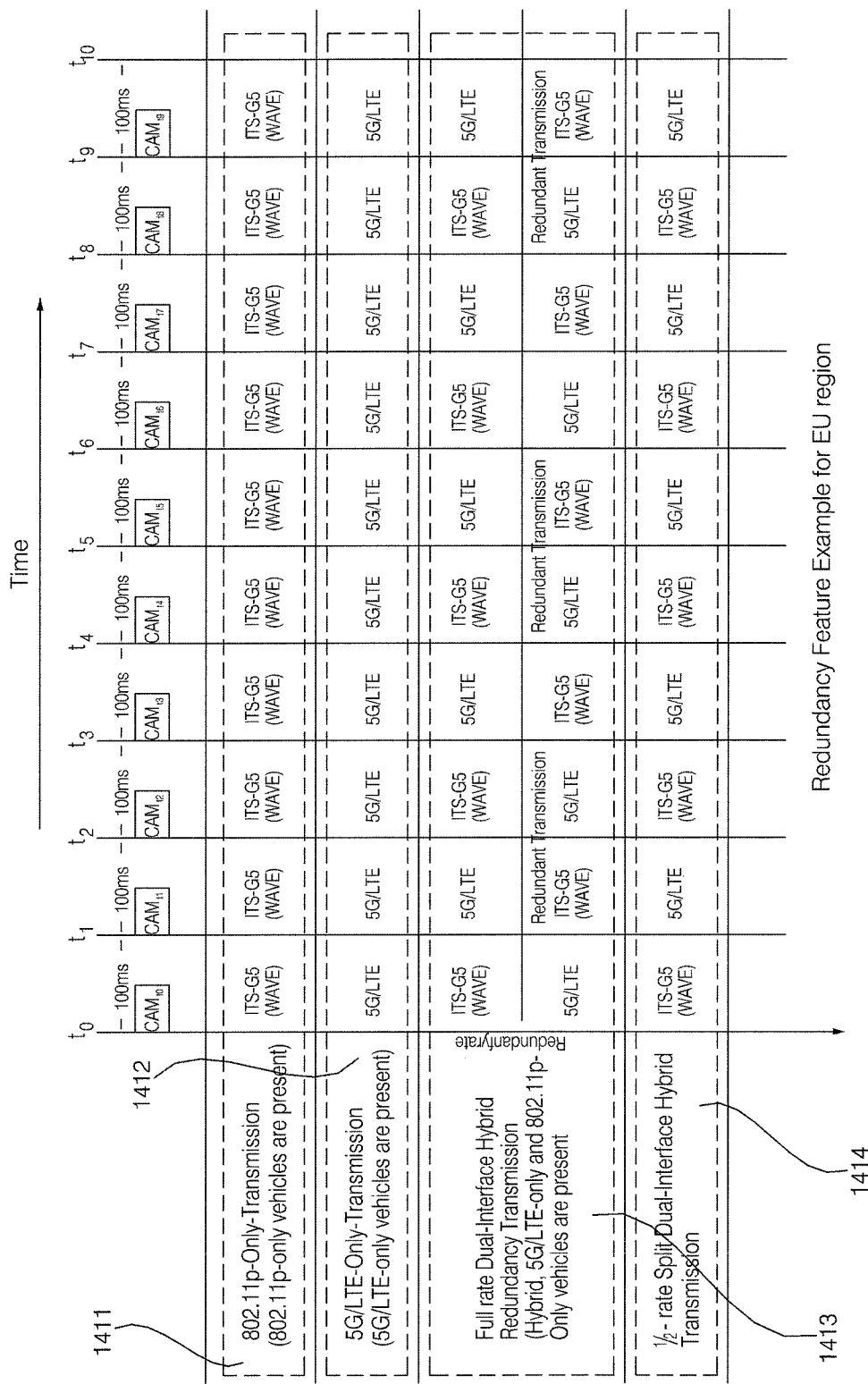
FIGS. 14A and 14B are diagrams illustrating a message transmission redundancy rate according to an embodiment of the present invention.
Figure 14B:
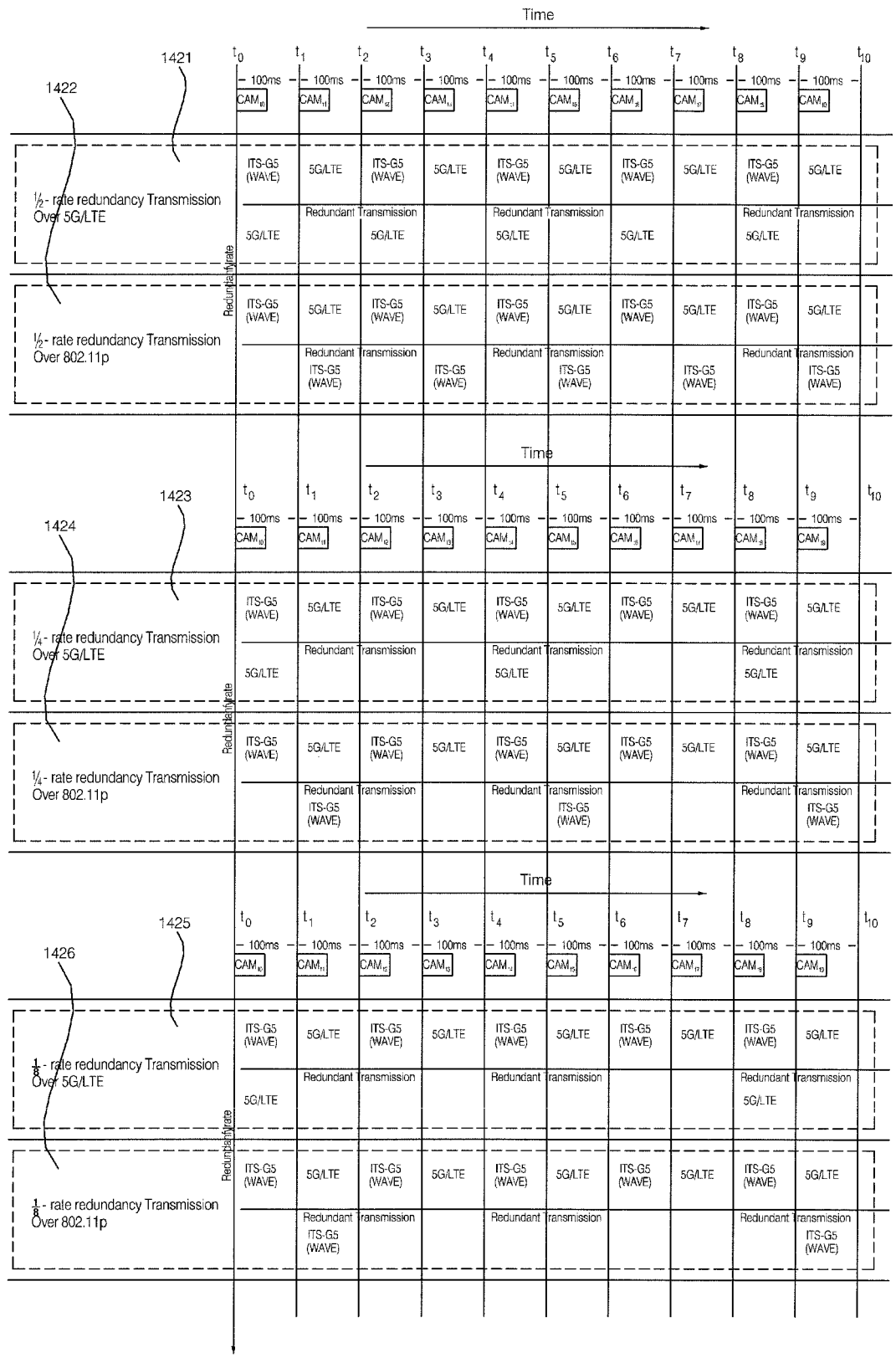

Next, FIGS. 14A and 14B are diagrams illustrating a message transmission redundancy rate according to an embodiment of the present invention. The processor 470 can determine a redundancy rate of at least one of the first communication technology and the second communication technology. The redundancy rate can also be determined as the ratio of the number of times of a message is to be transmitted using both of the first and second communication technologies at the same time, compared to the number of times of a message is to be transmitted using one of the first and second communication technologies.

Further, the processor 470 can determine a redundancy rate of at least one of the first and second communication technologies based on at least one of a user input, communication information, sensing information, and information from a network control service provider. The message synchronization system 100 included in the processor 470 can also determine a redundancy rate of at least one of the first and second communication technologies based on at least one of the user input, the communication information, the sensing information, and the information from a network control service provider.

The message synchronization controller 1070 included in the message synchronization system 1000 can determine a redundancy rate of at least one of the first and second communication technologies based on at least one of the user input, the communication information, the sensing information, and the information from a network control service provider.

Referring to FIG. 14A, the processor 470 can transmit a message using only the first communication technology in 1411 and transmit a message using only the second communication technology in 1412. The processor 470 can also transmit a message using both of the first and second communication technologies in 1413. In this instance, the processor 470 can transmit a message every predetermined period using the first and second communication technologies.

The processor 470 can also transmit a message using both of the first and second communication technologies at the same time. For example, the processor 470 can transmit a message at a first period using the first communication technology, and transmit a message at the first period using the second communication technology. The first period may be 100 ms.

In addition, the processor 470 can transmit a message by alternatively using the first and second communication technologies in 1414. In this instance, the processor 470 can transmit a message at the first period by alternatively using the first and second communication technologies. Again, the first period may be 100 ms.

Specifically, at a first point in time, the processor 470 can transmit a message using the first communication technology, at a second point in time after the first period elapses from the first point in time, the processor 470 can transmit a message using the second communication technology, and at a third point in time after the first period elapses from the second point in time, the processor 470 can transmit a message using the first communication technology. At a fourth point in time after the first period elapses from the third point in time, the processor 470 can transmit a message using the second communication technology. Then, the processor 470 can repeatedly transmit a message at the first period by alternatively using the first and second communication technologies.

Referring to FIG. 14B, if a redundancy rate of the second communication technology is determined to be ½-rate, the processor 470 can transmit a message at the first period by alternatively using the first and second communication technologies, and while doing so redundantly transmit the message at a second period using the second communication method in 1421. For example, the second period may be 200 ms.

If a redundancy rate of the first communication technology is determined to be ½-rate, the processor 470 can transmit a message at the first period by alternatively using the first and second communication technologies, and while doing so, can redundantly transmit the message at a second period using the first communication technology in 1422. Again, the second period may be 200 ms.

If a redundancy rate of the second communication technology is determined to be ¼-rate, the processor 470 can transmit a message at the first period by alternatively using the first and second communication technologies, and while doing so, can redundantly transmit the message at a third period using the second communication technology in 1423. The third period may be 400 ms.

If a redundancy rate of the first communication technology is determined to be ¼-rate, the processor 470 can transmit a message at the first period by alternatively using the first and second communication technologies, and while doing so, can redundantly transmit the message at a third period using the first communication technology in 1424. For example, the third period may be 400 ms.

If a redundancy rate of the second communication technology is determined to be ⅛-rate, the processor 470 can transmit a message at the first period by alternatively using the first and second communication technologies, and while doing so, may redundantly transmit the message at a fourth period using the second communication technology in 1425. For example, the fourth period may be 800 ms.

If a redundancy rate of the first communication technology is determined to be ¼-rate, the processor 470 can transmit a message at the first period by alternatively using the first and second communication technologies, and while doing so, can redundantly transmit the message at a fourth period using the first communication technology in 1426. Again, the fourth period may be 800 ms.

Figure 15:
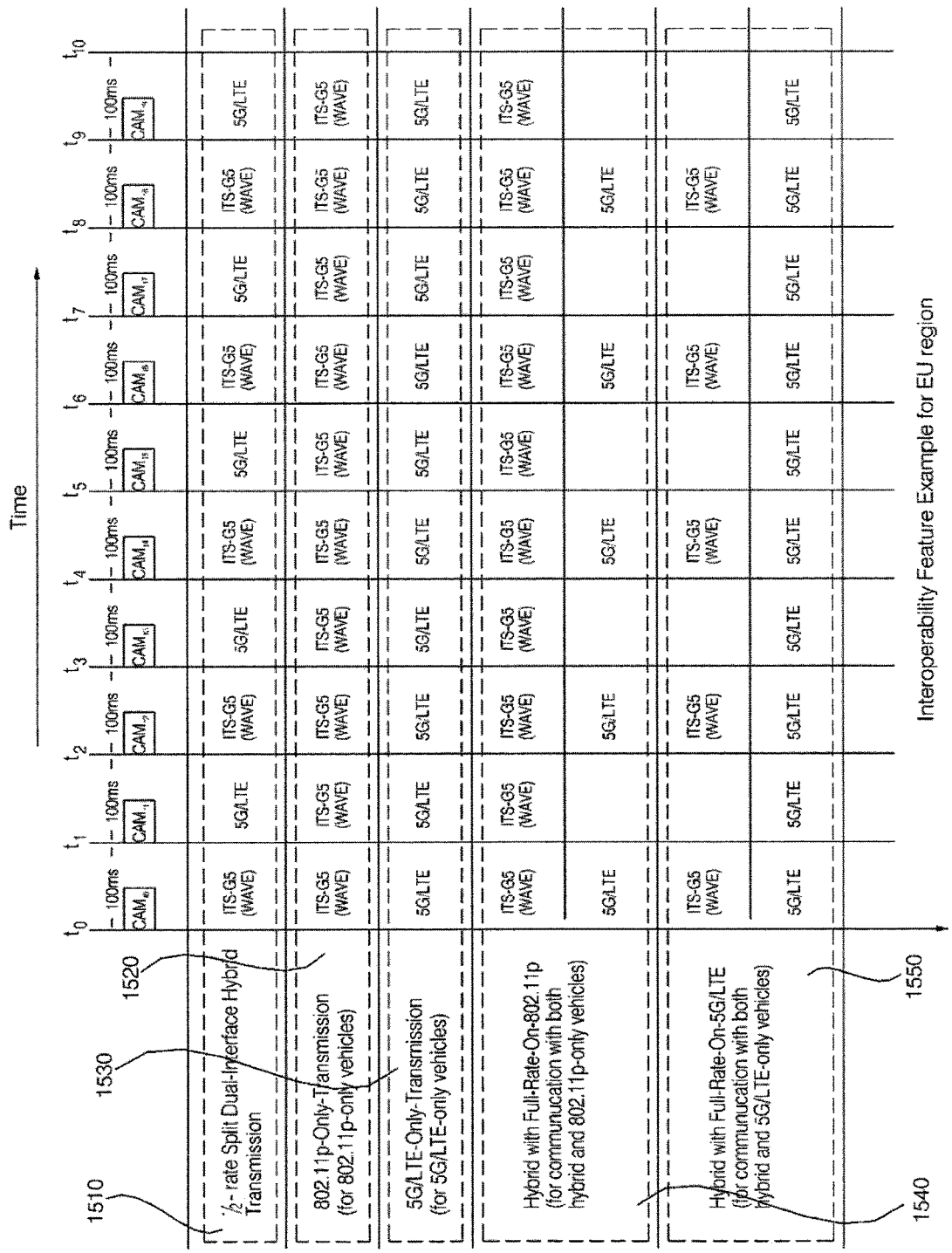
FIG. 15 is a diagram illustrating operations of the first and second communication units according to an embodiment of the present invention.

Next, FIG. 15 is a diagram illustrating operations of the first and second communication units according to an embodiment of the present invention. In addition, the first communication unit 431 can transmit a message using the first communication technology, and the second communication unit 432 can transmit a message using the second communication technology. The processor 470 can also transmit a message at a first period by alternatively using the first communication unit 431 and the second communication unit 432 in 1510. For example, the first period may be 100 ms.

Specifically, at a first point in time, the processor 470 can transmit a message through the first communication unit 431, at a second point in time after the first period elapses from the first point in time, the processor 470 can transmit a message through the second communication unit 432, and at a third point in time after the first period elapses from the second point in time, the processor 470 can transmit a message through the first communication unit 431.

At a fourth point in time after the first period elapses from the third point in time, the processor 470 can transmit a message through the second communication unit 432. Then, the processor 470 can repeatedly transmit a message at the first period by alternatively using the first communication 431 and the second communication 432.

The processor 470 can transmit a message at the first period through the first communication unit 431 in 1520 and transmit a message at the first period through the second communication unit 432 in 1530. While transmitting a message at the first period through the first communication unit 431, the processor 470 can transmit a message at a second period through the second communication unit 432 in 1540. For example, the second period may be 200 ms. While transmitting a message at the first period through the second communication unit 432, the processor 470 can transmit a message at the second period through the first communication unit 431 in 1550.

Figure 16:
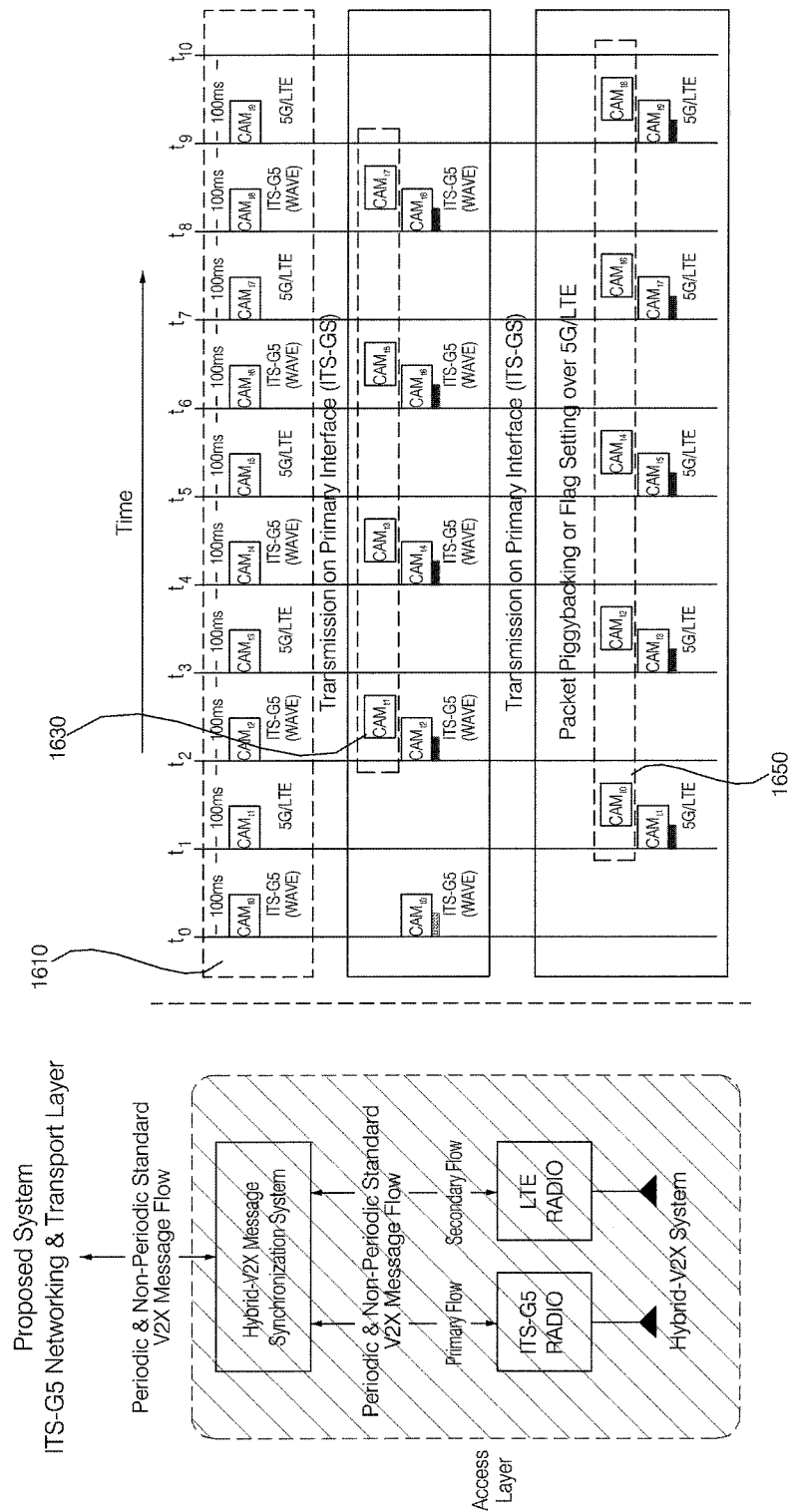
FIG. 16 is a diagram illustrating an operation of performing a packet drop management function according to an embodiment of the present invention.

Next, FIG. 16 is a diagram illustrating an operation of performing a packet drop management function according to an embodiment of the present invention. Referring to FIG. 16, the processor 470 performs a packet drop management function by performing piggybacking. The processor 470 can transmit a message a first period by alternatively using the first and second communication technologies. For example, the first period may be 100 ms. The processor 470 can also transmit a first message in a first interval using the first communication technology.

In addition, the processor 470 can transmit a second message in a second interval using the second communication technology. In this instance, the processor 470 can transmit the first message, which is already transmitted, along with the second message in 1610. The processor 470 can also transmit a third message in a third interval using the first communication technology. In this instance, the processor 470 can transmit the second message, which is already transmitted, along with the third message in 1630.

As such, piggybacking is a technique by which a previously-transmitted message is transmitted as new. By performing piggybacking, it is possible to prevent a packet drop. The processor 470 can also perform a packet drop management function by setting a flag.

In particular, the processor 470 can set a flag to distinguish whether to perform piggybacking. For example, if a packet including a message is transmitted from a previous interval, the processor 470 can set a flag to 1. In another example, if a packet including a message is not transmitted from a previous interval, the processor 470 can set a flag to 0.

Figure 17A:
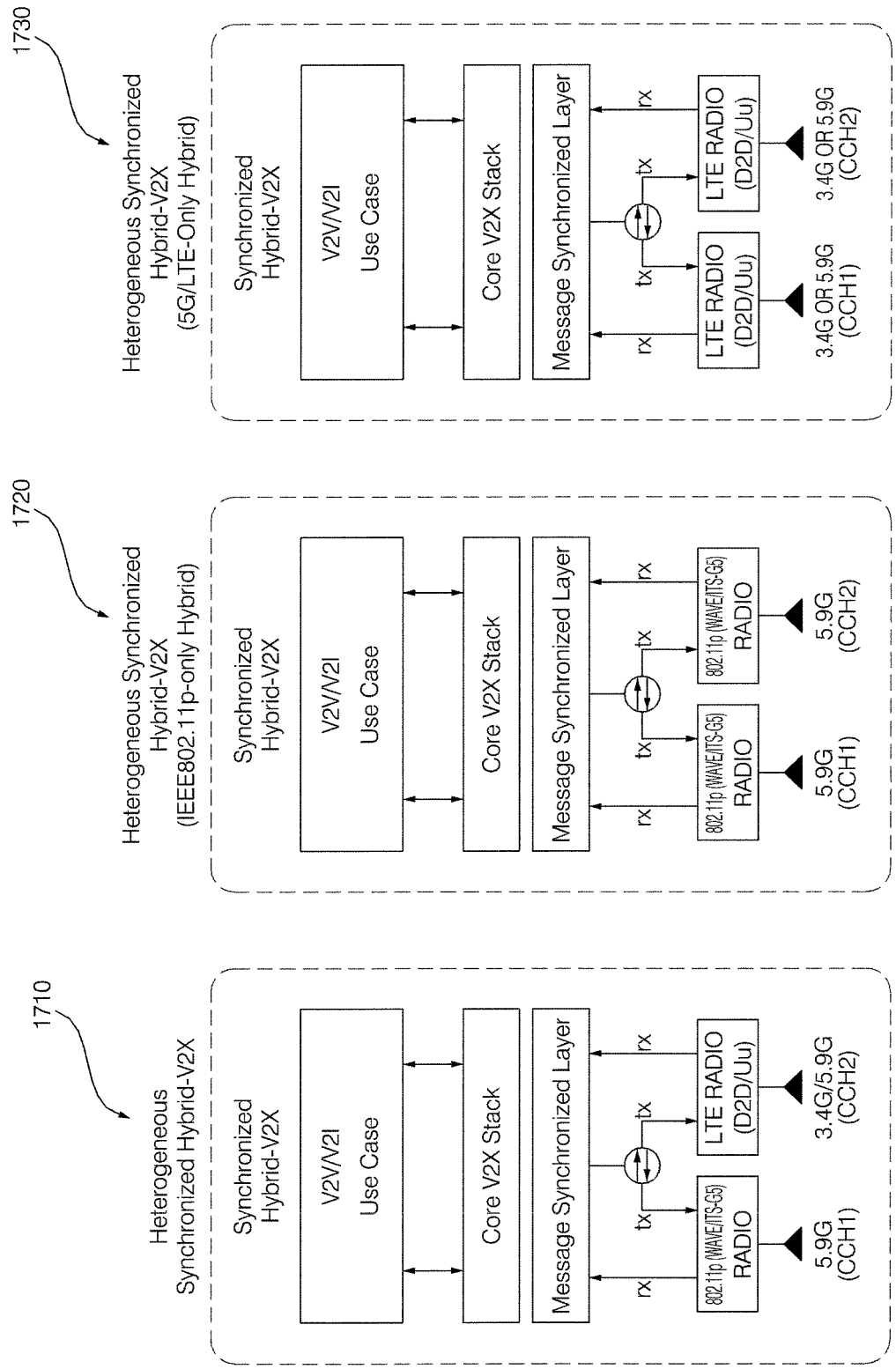
Referring to FIGS. 17A and 17B are diagrams illustrating a communication apparatus according to an embodiment of the present invention.
Figure 17B:
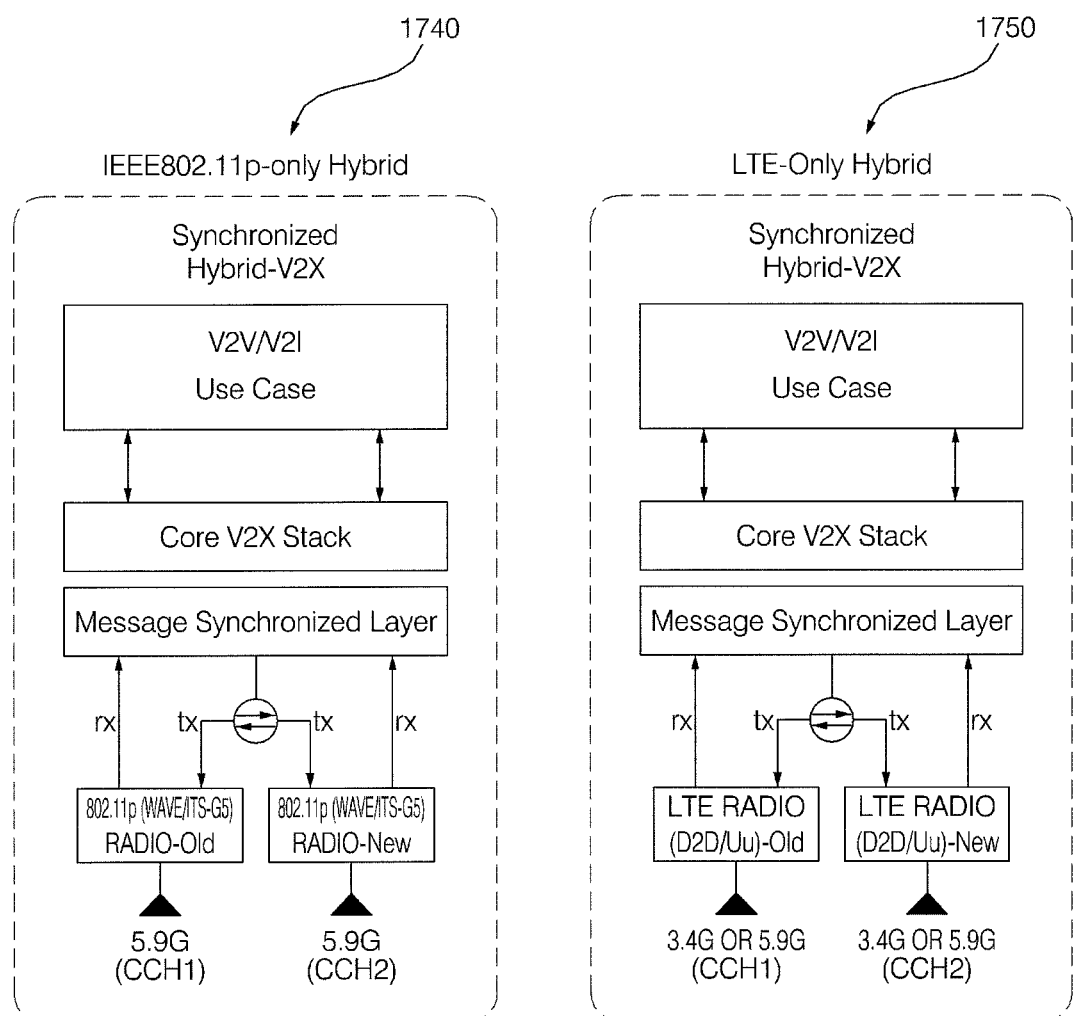

Next, FIGS. 17A and 17B are diagrams illustrating a communication apparatus according to an embodiment of the present invention. As in the example of 1710 of FIG. 17A, the first communication unit 431 can utilize the first communication technology and the second communication unit 432 can use the second communication technology. In this instance, the first communication unit 431 may use a frequency of 5.9 GHz, and the second communication unit 432 may use a frequency of 3.4 GHz or 5.9 GHz.

As shown in the example of 1720 of FIG. 17A, the first communication unit 431 can utilize the first communication technology and the second communication unit 342 can utilize the first communication technology. In this instance, the first communication unit 431 may use a frequency of 5.9 GHz, and the second communication unit 432 may use a frequency of 5.9 GHz.

As shown in the example of 1730 of FIG. 17A, the first communication unit 431 can utilize the second communication technology and the second communication technology 432 can utilize the second communication technology. In this instance, the first communication unit 431 may use a frequency of 3.4 GHz or 5.9 GHz, and the second communication unit 432 may use a frequency of 3.4 GHz or 5.9 GHz.

As shown in the example of 1740 of FIG. 17B, the first communication unit 431 can utilize the first communication technology and the second communication unit 342 can utilize the first communication technology. In this instance, the first communication unit 431 may use a frequency of 5.9 GHz, and the second communication unit 432 may use a frequency of 5.9 GHz.

As shown in the example of 1750 of FIG. 17B, the first communication unit 431 can utilize the second communication technology and the second communication technology 432 can utilize the second communication technology. In this instance, the first communication unit 431 may use a frequency of 3.4 GHz or 5.9 GHz, and the second communication unit 432 may use a frequency of 3.4 GHz or 5.9 GHz.

Figure 18:
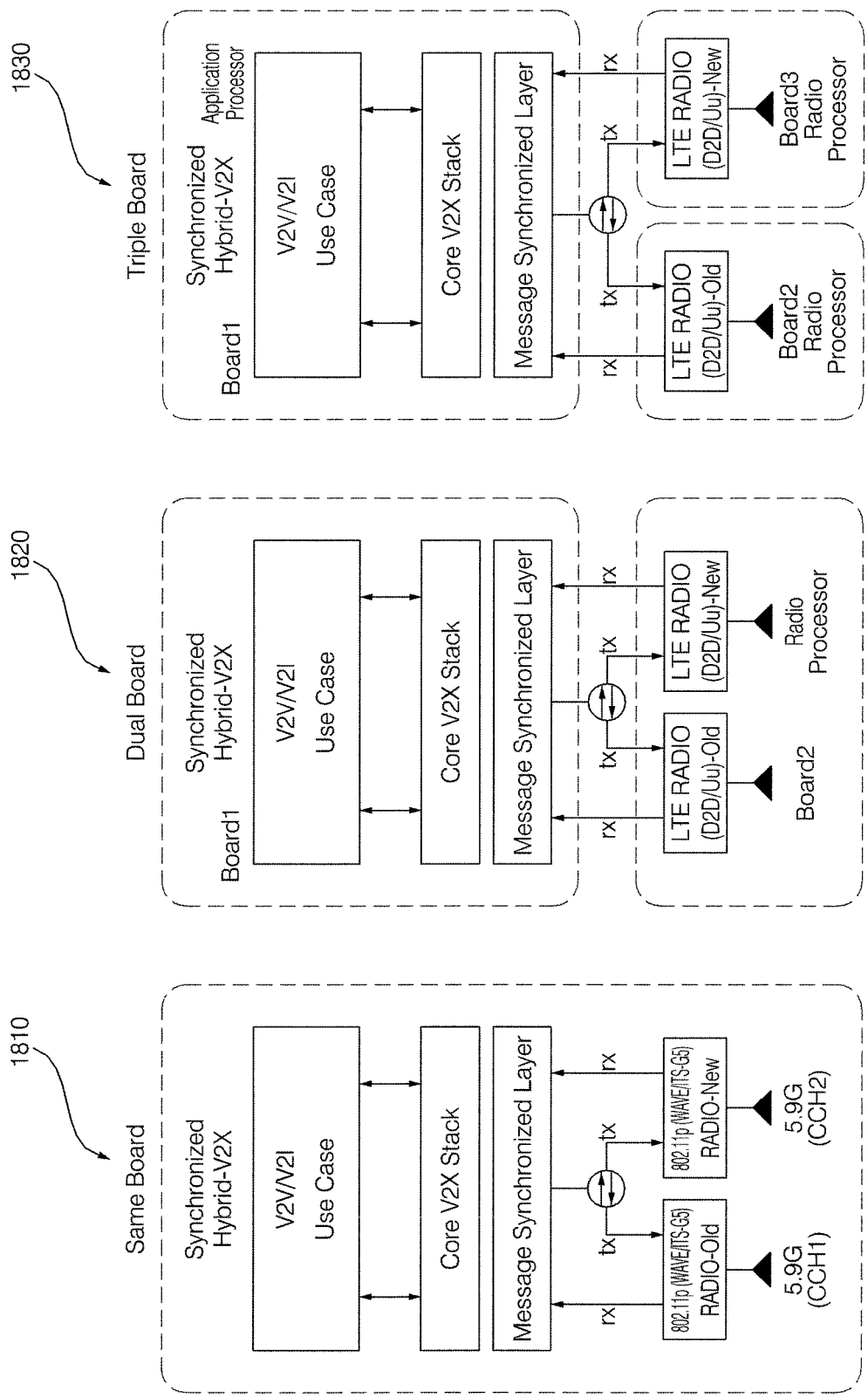
FIG. 18 is a diagram illustrating a hardware configuration of a processor according to an embodiment of the present invention.

Next, FIG. 18 is a diagram illustrating a hardware configuration of a processor according to an embodiment of the present invention. Referring to FIG. 18, the communication device 400 may include a processing board. As shown in the example of 1810 of FIG. 18, the processor 470, the first communication unit 431, and the second communication unit 432 can all be disposed on the same processing board. As shown in the example of 1820 of FIG. 18, the processor 470 can be disposed on a first processing board, and the first communication unit 431 and the second communication unit 432 can be disposed on a second processing board.

As shown in the example of 1830 of FIG. 18, the processor can be disposed on a first processing board, the first communication unit 431 can be disposed on a second processing board, and the second communication unit 432 can be disposed on a third processing board.

Figure 19A:
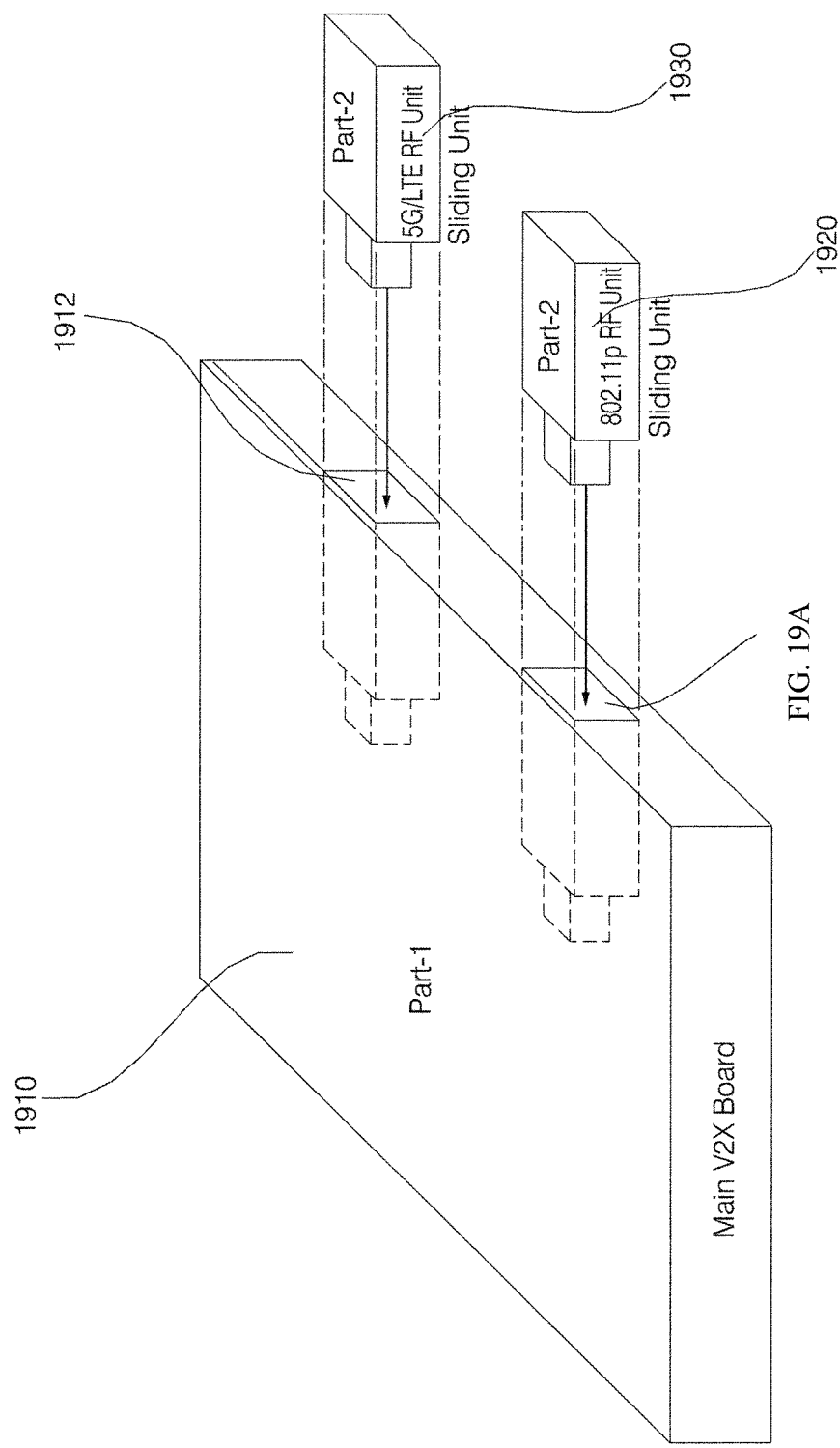
FIG. 19A is a diagram illustrating a hardware structure of a processor according to an embodiment of the present invention.

Next, FIG. 19A is a diagram illustrating a hardware structure of a processor according to an embodiment of the present invention. Referring to FIG. 19A, in the hardware structure of the communication device 400, constituent elements other than the first communication unit 431 and the second communication unit 432 can act as a first part 1910.

In addition, the first communication unit 431 can act as a second part 1920, and the second communication unit 432 can act as a third part 1930. The first part 1920 can include a first socket 1911 and a second socket 1912, and the second part 1920 can be slidably coupled to the first socket 1911.

Further, the third part 1930 can be slidably coupled to the second socket 1912. The second part 1920 and the third part 1930 can be electrically combined with the first part 1910 through at least one of SDIO, UART, SPI, I2C, GPIO, USB, RMII, RGMII interface.

For example, the first part can be the processing board including a first sliding slot 1911 and a second sliding slot 1912. The first communication unit 431 can be slidably coupled to the first sliding slot 1911 through at least one of SDIO, UART, SPI, I2C, GPIO, USB, RMII, RGMII interface. Also, the second communication unit 432 can be slidably coupled to the second sliding slot through at least one of SDIO, UART, SPI, I2C, GPIO, USB, RMII, RGMII interface.

Next, FIGS. 19B to 20F are diagrams illustrating a frequency band used by a communication apparatus according to an embodiment of the present invention. As shown in the example of 2001 in FIG. 19B, the first communication unit 431 can use a frequency band of 5875 to 5885 MHz, and the second communication unit 432 can use a frequency band of 5895 to 5905 MHz. That is, 10 MHz-wide frequency bands with a band gap of 10 MHz can be allocated to the first communication unit 431 and the second communication unit 432.

Figure 19B:
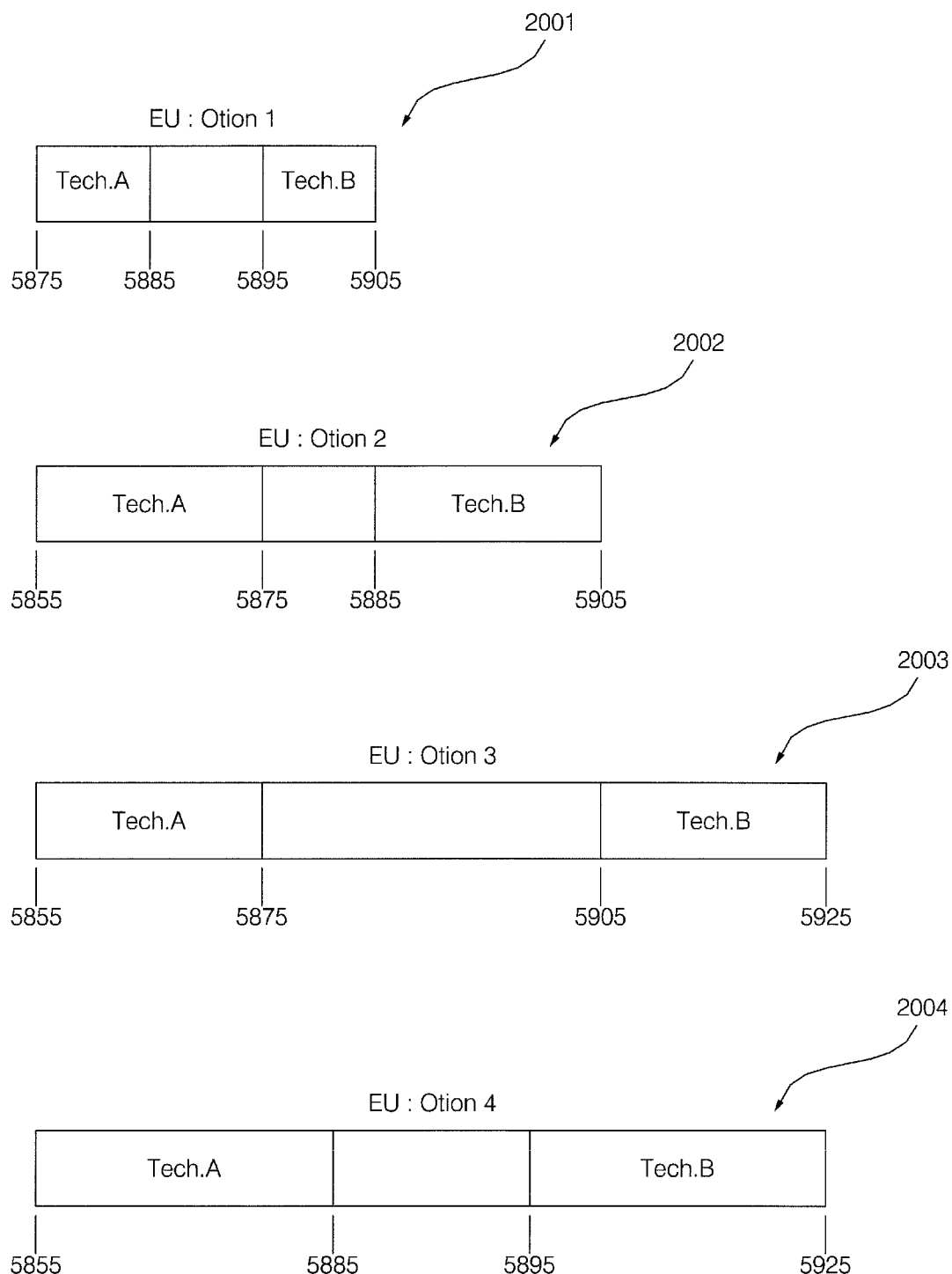

As shown in the example of 2002 in FIG. 19B, the first communication unit 431 can use a frequency band of 5855 to 5875 MHz, and the second communication unit 432 can use a frequency band of 5885 to 5905 MHz. That is, 20 MHz-wide frequency bands with a band gap of 10 MHz can be allocated to the first communication unit 431 and the second communication unit 432.

As shown in the example of 2003 in FIG. 19B, the first communication unit 431 can use a frequency band of 5855 to 5875 MHz, and the second communication unit 432 can use a frequency band of 5895 to 5925 MHz. That is, 20 MHz-wide frequency bands with a band gap of 30 MHz can be allocated to the first communication unit 431 and the second communication unit 432.

As shown in the example of 2004 in FIG. 19B, the first communication unit 431 can use a frequency band of 5855 to 5885 MHz, and the second communication unit 432 can use a frequency band of 5895 to 5925 MHz. That is, 30 MHz-wide frequency bands with a band gap of 10 MHz can be allocated to the first communication unit 431 and the second communication unit 432.

Figure 20A:
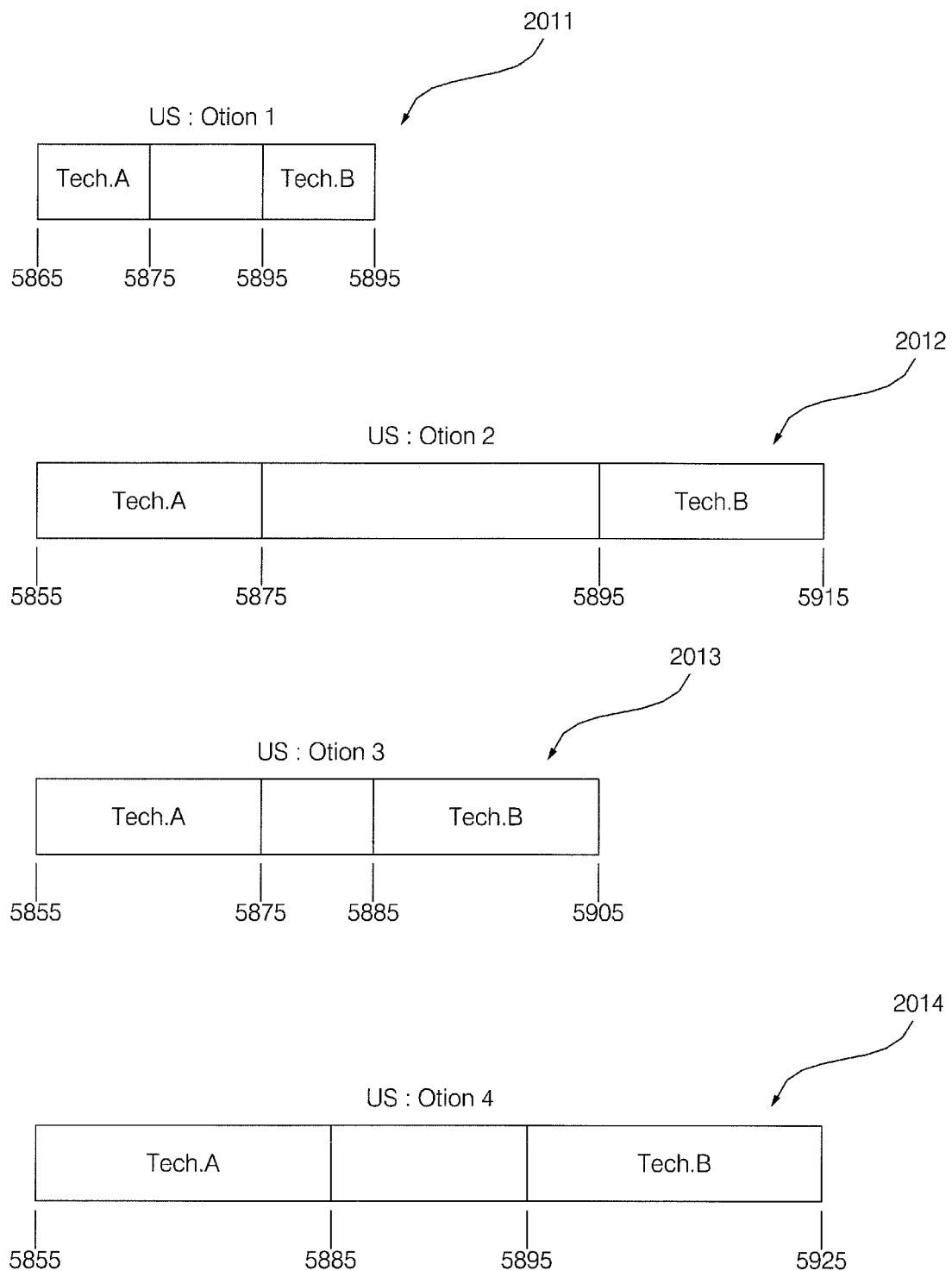

As shown in the example of 2011 in FIG. 20A, the first communication unit 431 can use a frequency band of 5865 to 5875 MHz, and the second communication unit 432 can use a frequency band of 5885 to 5895 MHz. That is, 10 MHz-wide frequency bands with a band gap of 10 MHz can be allocated to the first communication unit 431 and the second communication unit 432.

As shown in the example of 2012 in FIG. 20A, the first communication unit 431 can use a frequency band of 5855 to 5875 MHz, and the second communication unit 432 can use a frequency band of 5895 to 5915 MHz. That is, 20 MHz-wide frequency bands with a band gap of 20 MHz can be allocated to the first communication unit 431 and the second communication unit 432.

As shown in the example of 2013 in FIG. 20A, the first communication unit 431 can use a frequency band of 5855 to 5875 MHz, and the second communication unit 432 can use a frequency band of 5885 to 5905 MHz. That is, 20 MHz-wide frequency bands with a band gap of 10 MHz can be allocated to the first communication unit 431 and the second communication unit 432.

As shown in the example of 2014 in FIG. 20A, the first communication unit 431 can use a frequency band of 5855 to 5885 MHz, and the second communication unit 432 can use a frequency band of 5895 to 5925 MHz. That is, 30 MHz-wide frequency bands with a band gap of 10 MHz can be allocated to the first communication unit 431 and the second communication unit 432.

Figure 20B:
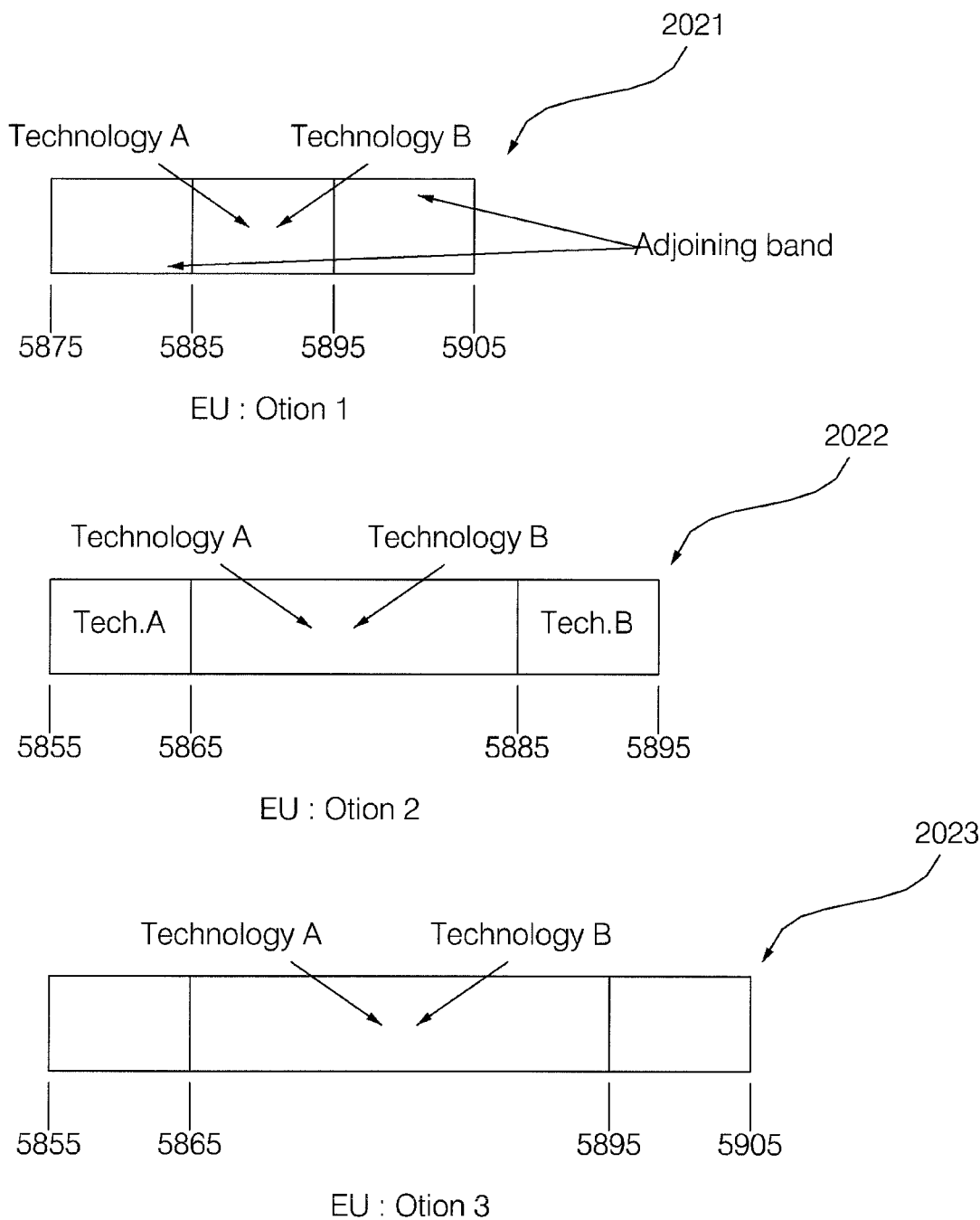

As shown in the example of 2021 in FIG. 20B, the first communication unit 431 can use a frequency band of 5885 to 5895 MHz, and the second communication unit 432 can use a frequency band of 5885 to 5895 MHz. As shown in the example of 2022 in FIG. 20B, the first communication unit 431 can use a frequency band of 5865 to 5885 MHz, and the second communication unit 432 can use a frequency band of 5865 to 5885 MHz.

As shown in the example of 2023 in FIG. 20B, the first communication unit 431 can use a frequency band of 5865 to 5895 MHz, and the second communication unit 432 can use a frequency band of 5865 to 5895 MHz. As shown in the example of 2031 in FIG. 20C, the first communication unit 431 can use a frequency band of 5885 to 5895 MHz, and the second communication unit 432 can use a frequency band of 5885 to 5895 MHz.

Figure 20C:
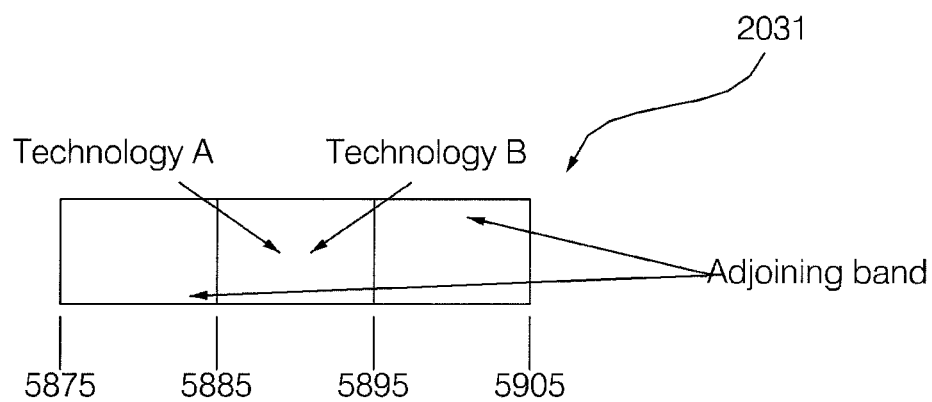
Figure 20C:
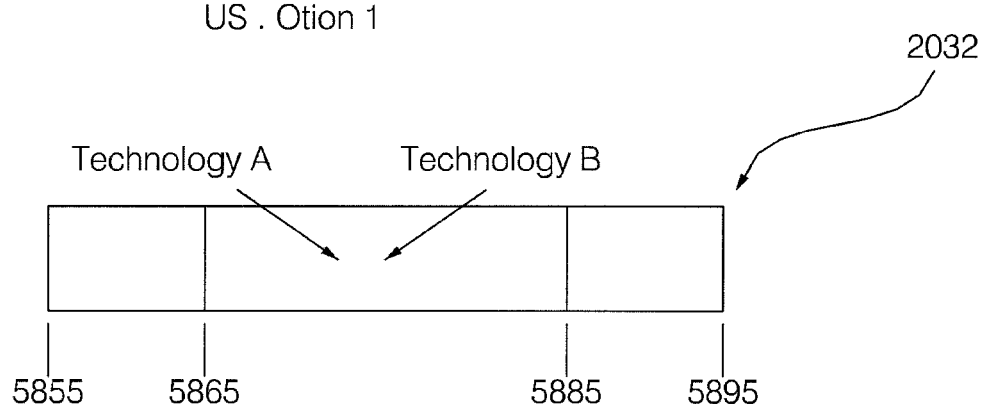
Figure 20C:
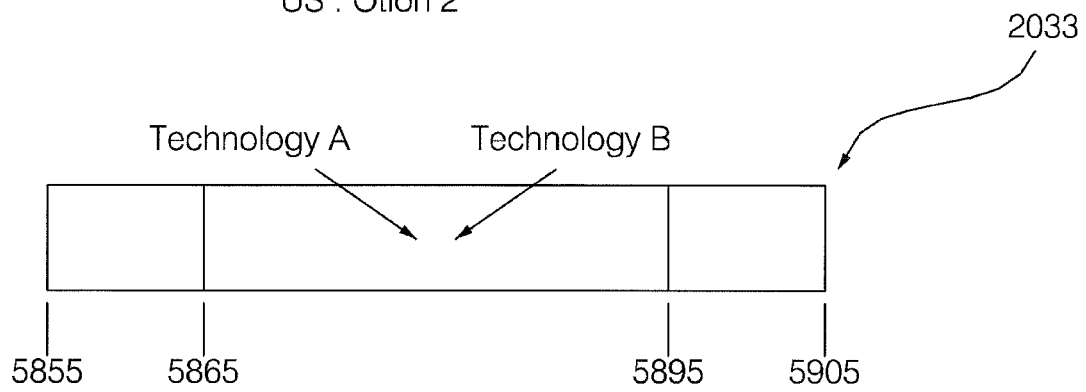

As shown in the example of 2032 in FIG. 20C, the first communication unit 431 can use a frequency band of 5865 to 5885 MHz, and the second communication unit 432 can use a frequency band of 5865 to 5885 MHz. As shown in the example of 2033 in FIG. 20C, the first communication unit 431 can use a frequency band of 5865 to 5895 MHz, and the second communication unit 432 can use a frequency band of 5865 to 5895 MHz.

Figure 20D:
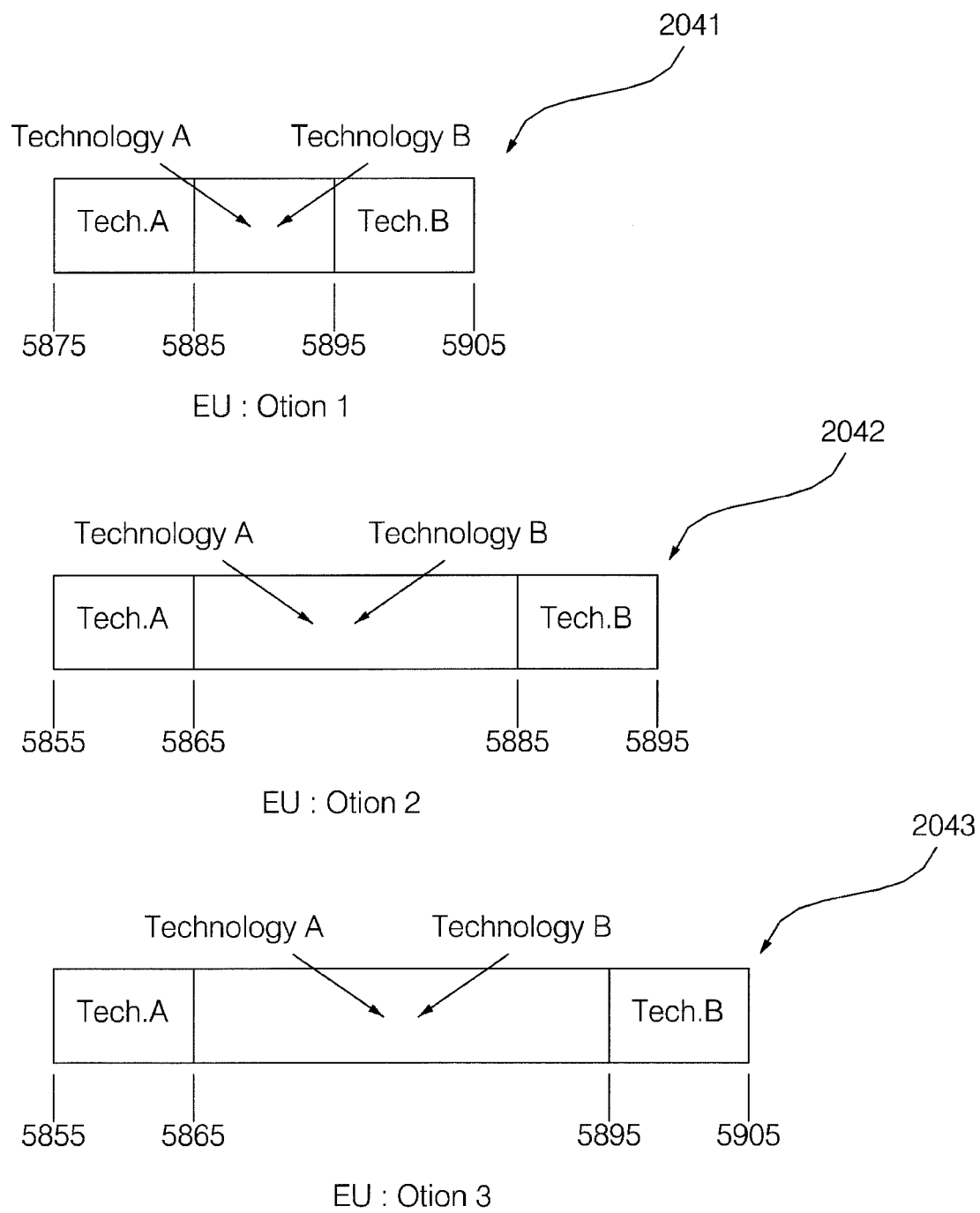

As shown in the example of 2041 in FIG. 20D, the first communication unit 431 can use a frequency band of 5875 to 5885 MHz, and the second communication unit 432 can use a frequency band of 5895 to 5905 MHz. The first communication unit 431 and the second communication unit 432 can both use a frequency band of 5885 to 5895 MHz.

As shown in the example of 2042 in FIG. 20D, the first communication unit 431 can use a frequency band of 5855 to 5865 MHz, and the second communication unit 432 can use a frequency band of 5885 to 5895 MHz. The first communication unit 431 and the second communication unit 432 can both use a frequency band of 5865 to 5885 MHz.

As shown in the example of 2043 in FIG. 20D, the first communication unit 431 can use a frequency band of 5855 to 5865 MHz, and the second communication unit 432 can use a frequency band of 5895 to 5905 MHz. The first communication unit 431 and the second communication unit 432 can both use a frequency band of 5865 to 5895 MHz.

Figure 20E:
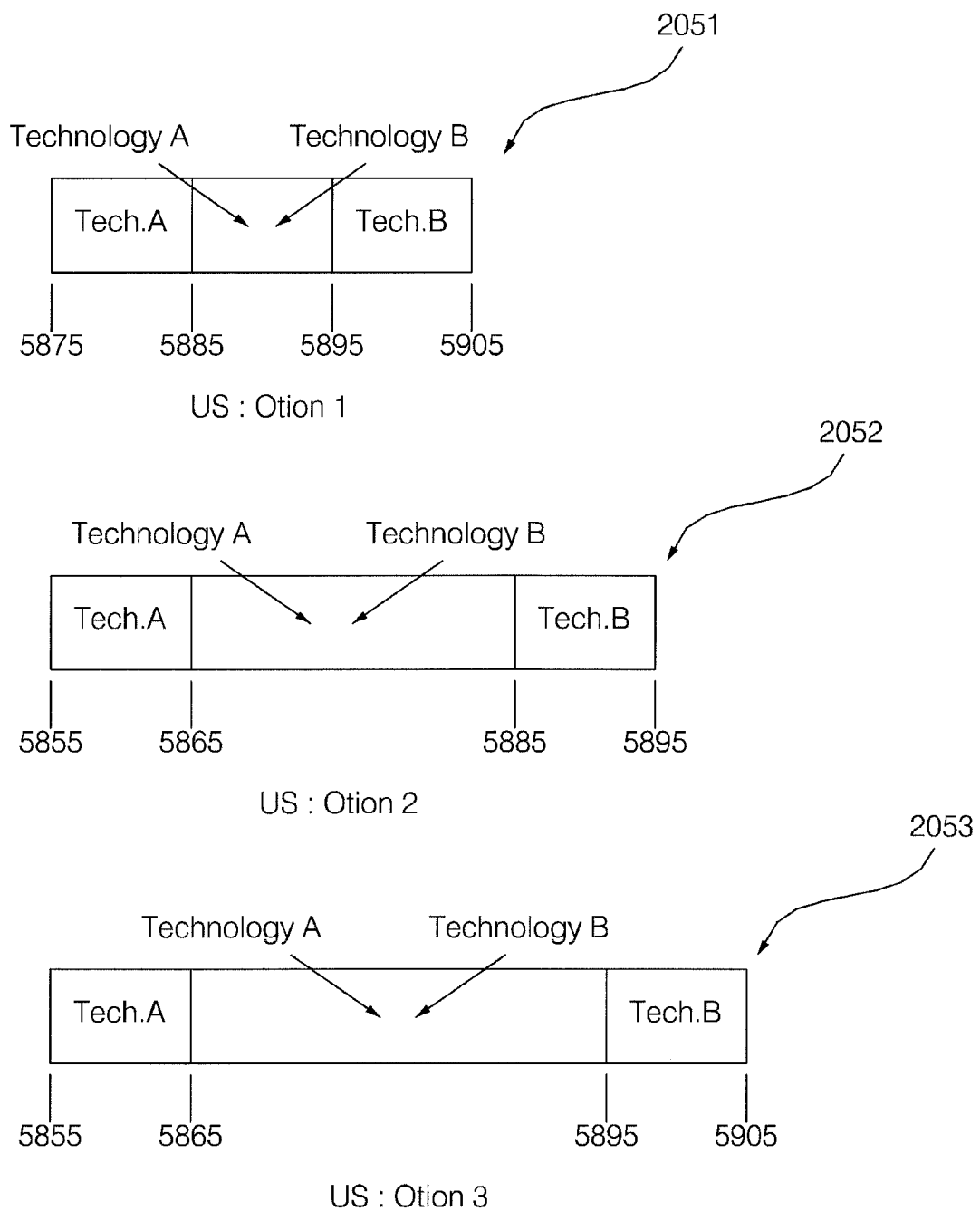

As shown in the example of 2051 in FIG. 20E, the first communication unit 431 can use a frequency band of 5875 to 5885 MHz, and the second communication unit 432 can use a frequency band of 5895 to 5905 MHz. The first communication unit 431 and the second communication unit 432 can both use a frequency band of 5885 to 5895 MHz.

As shown in the example of 2052 in FIG. 20E, the first communication unit 431 can use a frequency band of 5855 to 5865 MHz, and the second communication unit 432 can use a frequency band of 5885 to 5895 MHz. The first communication unit 431 and the second communication unit 432 can both use a frequency band of 5865 to 5885 MHz.

As shown in the example of 2053 in FIG. 20E, the first communication unit 431 can use a frequency band of 5855 to 5865 MHz, and the second communication unit 432 can use a frequency band of 5895 to 5905 MHz. The first communication unit 431 and the second communication unit 432 can both use a frequency band of 5865 to 5895 MHz.

Figure 20F:
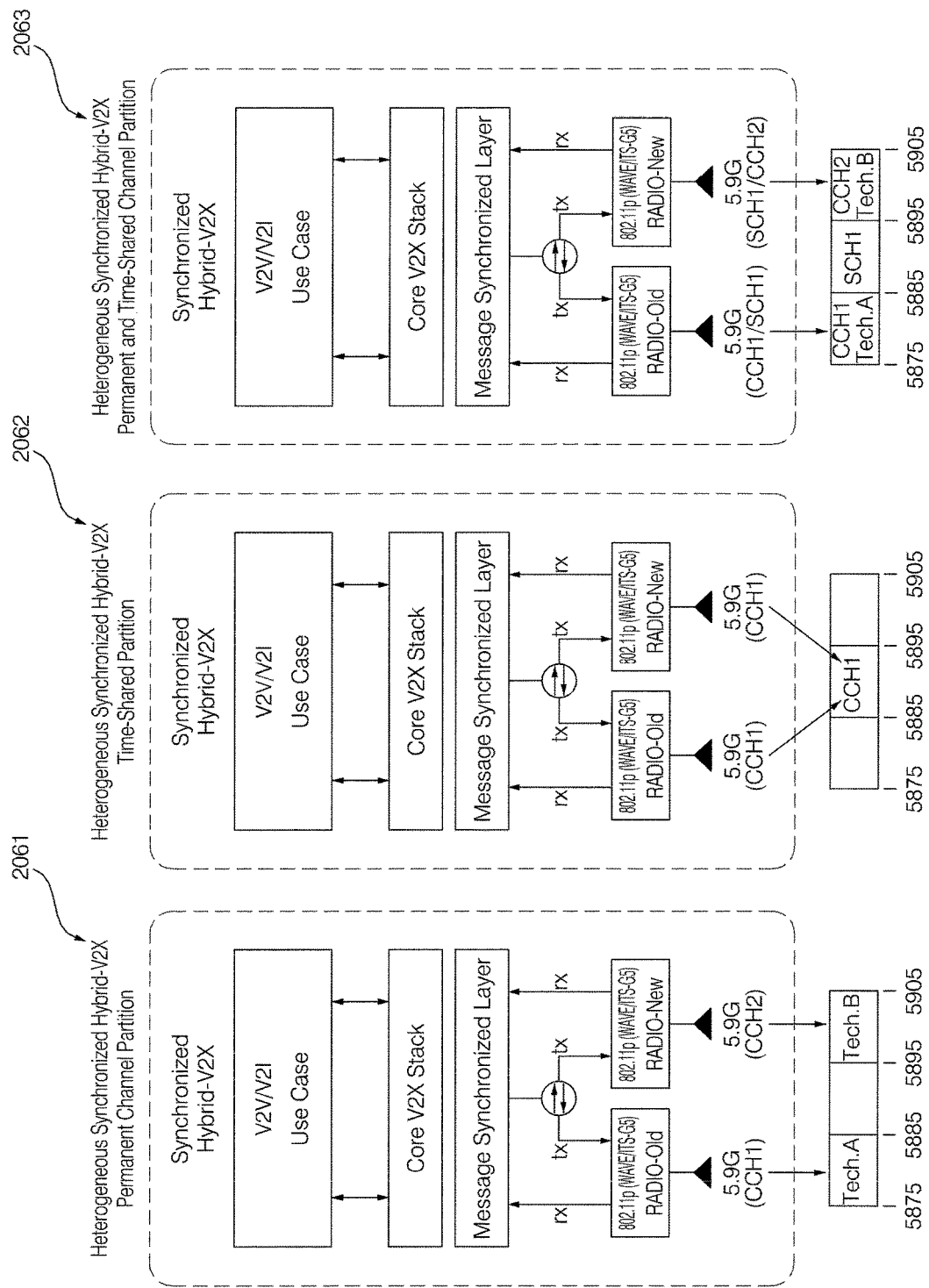

As shown in the example of 2061 in FIG. 20F, the first communication unit 431 and the second communication unit 432 can use different frequency respectively allocated thereto. As shown in the example of 2062 in FIG. 20F, the first communication unit 431 and the second communication unit 432 can use the same frequency band. As shown in the example of 2063 in FIG. 20F, the first communication unit 431 and the second communication unit 432 can use the same frequency band, while using different frequency bands respectively allocated thereto.

The embodiments of the present invention have the following advantages. First, by exchanging data with an external device using two communication units, it is possible to reduce wireless channel congestion and to prevent a data loss occurring due to excessive communication traffic. Second, it is possible to increase the reliability of data received using V2X communication. Third, it is possible to prevent an accident as a data loss is prevented.

The present invention as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet).

In addition, the computer may include a processor or a controller. Thus, the above detailed description should not be construed as being limited to the embodiments set forth herein in all terms, but should be considered by way of example. The scope of the present invention should be determined by the reasonable interpretation of the accompanying claims and all changes in the equivalent range of the present invention are intended to be included in the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A communication apparatus for vehicle, which communicates with an entity including at least one of a nearby vehicle, infrastructure, and a mobile terminal, the communication apparatus comprising:
an interface unit;
a first communication unit configured to transmit a first transmission signal to the entity, and receive a first receipt signal from the entity using a first communication technology;
a second communication unit configured to transmit a second transmission signal to the entity, and receive a second receipt signal from the entity using a second communication technology different than the first communication technology; and
a processor configured to:
transmit a first message using at least one of the first transmission signal or the second transmission signal based on a determined transmission characteristic of the first transmission signal and the second transmission signal, and
receive a second message using at least one of the first receipt signal or the second receipt signal based on the determined transmission characteristic of the first transmission signal and the second transmission signal,
wherein the processor comprises a message synchronization system configured to determine processing of the first transmission signal, the second transmission signal, the first receipt signal, and the second receipt signal,
wherein the message synchronization system is further configured to, based on sensing information from a sensing unit through the interface unit, determine a transmission rate of the first transmission signal and the second transmission signal, wherein the sensing unit is configured to sense a state of the vehicle,
wherein the communication apparatus further comprises:
a processing board in which the first communication unit, the second communication unit, and the processor are positioned,
wherein the processing board includes a first sliding slot and a second sliding slot,
wherein the first communication unit is slidably coupled to the first sliding slot, and
wherein the second communication unit is slidably coupled to the second sliding slot.

2. The communication apparatus according to claim 1, wherein the processor is further configured to transmit the first message through the first communication unit and the second communication unit simultaneously when transmitting the first message using the combination of the first transmission signal and the second transmission signal.

3. The communication apparatus according to claim 2, wherein:
the first communication technology and the second communication technology coexist in a first band,
the first communication technology uses a frequency in a first sub-band,
the second communication technology uses a frequency in a second sub-band, and
the first sub-band and the second sub-band are included in the first band.

4. The communication apparatus according to claim 2, wherein the first communication technology and the second communication technology use a same frequency in a first band.

5. The communication apparatus according to claim 1, wherein the message synchronization system comprises a message synchronization controller configured to determine a transmission period of each of the first transmission signal and the second transmission signal for determining the transmission characteristic of the first transmission signal and the second transmission signal.

6. The communication apparatus according to claim 5, wherein the message synchronization controller is further configured to determine the transmission rate of each of the first transmission signal and the second transmission signal for determining the transmission characteristic of the first transmission signal and the second transmission signal.

7. The communication apparatus according to claim 6, wherein the message synchronization controller is further configured to determine a first redundancy rate of a message transmitted based on the first transmission signal, and a second redundancy rate of a message transmitted based on the second transmission signal for determining the transmission characteristic of the first transmission signal and the second transmission signal.

8. The communication apparatus according to claim 6, wherein the message synchronization system further comprises a channel congestion determination unit configured to determine channel congestion of the first communication technology and the second communication technology for determining the transmission characteristic of the first transmission signal and the second transmission signal.

9. The communication apparatus according to claim 8, wherein the message synchronization controller is further configured to:
based on the channel congestion, determine a data capacity ratio of each of the first communication technology and the second communication technology, and
based on information on the data capacity ratio, determine a transmission rate of each of the first transmission signal and the second transmission signal.

10. The communication apparatus according to claim 8, wherein the message synchronization controller is further configured to:
based on the channel congestion, determine a frequency band for each of the first communication technology and the second communication technologies, and
based on information on the frequency band, determine a transmission rate of each of the first transmission signal and the second transmission signal.

11. The communication apparatus according to claim 5, wherein the message synchronization controller is further configured to:
transmit the first message in a first interval using the first transmission signal,
transmit the first message and a second message in a second interval using the second transmission signal, and
transmit the second message and a third message in a third interval using the first transmission signal.

12. The communication apparatus according to claim 5, wherein the message synchronization system further comprises a multi-rate message scheduler configured to split messages according to a transmission rate determined by the message synchronization controller.

13. The communication apparatus according to claim 1, wherein the message synchronization system further comprises a multi-rate message synchronizer configured to synchronize and merge the first receipt signal from the first communication unit and the second receipt signal from the second communication unit.

14. The communication apparatus according to claim 1, further comprising an input unit,
wherein the message synchronization system is further configured to, based on at least one of a user input signal received through the input unit and network information received from a network through at least one of the first communication unit and the second communication unit, determine the transmission rate of the first transmission signal and the second transmission signal.

15. The communication apparatus according to claim 14, wherein the message synchronization system is further configured to determine the transmission rate of the first transmission signal and the second transmission signal, based on a vehicle density estimated by fusion of the user input signal, the sensing information and the network information.

16. The communication apparatus according to claim 1, wherein the first message and the second message comprises at least one of a Basic Safety Message (BSM), a Cooperative Awareness Message (CAM), a Decentralized Environmental Notification Message (DENM), Signal Phase and Timing (SPaT), map data), a Signal Request Message (SRM), and a Signal Status Message (SSM).

17. The communication apparatus according to claim 1, wherein the message synchronization system sets at least one message distribution policy.

* * * * *